United States Patent
Cho

(10) Patent No.: US 9,609,115 B2
(45) Date of Patent: Mar. 28, 2017

(54) MOBILE TERMINAL AND METHOD OF CONTROLLING THE SAME

(71) Applicant: LG ELECTRONICS INC., Seoul (KR)

(72) Inventor: Taehoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/555,030

(22) Filed: Nov. 26, 2014

(65) Prior Publication Data

US 2015/0172440 A1    Jun. 18, 2015

(30) Foreign Application Priority Data

Dec. 16, 2013  (KR) .................... 10-2013-0156697

(51) Int. Cl.
*H04M 1/725*   (2006.01)
*G06F 3/0488*   (2013.01)

(52) U.S. Cl.
CPC ...... *H04M 1/72547* (2013.01); *G06F 3/0488* (2013.01); *H04M 1/72566* (2013.01); *H04M 1/72597* (2013.01); *H04M 2250/22* (2013.01)

(58) Field of Classification Search
CPC ......... H04M 1/72547; H04M 1/72566; H04M 1/72597; H04M 2250/22; G06F 3/0488; G06F 3/04842
See application file for complete search history.

(56) References Cited

U.S. PATENT DOCUMENTS

| | | | |
|---|---|---|---|
| 9,049,261 B2 * | 6/2015 | Shiplacoff | G06F 3/04842 |
| 2009/0247112 A1 * | 10/2009 | Lundy | G06F 3/0237 |
| | | | 455/404.1 |
| 2013/0067421 A1 * | 3/2013 | Osman | G06F 3/0481 |
| | | | 715/863 |
| 2014/0045470 A1 * | 2/2014 | Bridge | H04W 4/16 |
| | | | 455/415 |
| 2014/0155123 A1 * | 6/2014 | Lee | H04M 1/72519 |
| | | | 455/563 |
| 2014/0380198 A1 * | 12/2014 | Wang | G06F 3/04883 |
| | | | 715/758 |
| 2015/0207922 A1 * | 7/2015 | Kobayashi | H04M 1/67 |
| | | | 455/411 |

FOREIGN PATENT DOCUMENTS

| | | |
|---|---|---|
| KR | 10-2010-0124428 | 11/2010 |
| KR | 10-2012-0001477 | 1/2012 |
| KR | 10-2012-0053638 | 5/2012 |

OTHER PUBLICATIONS

Korean Intellectual Property Office Application Serial No. 10-2013-0156697, Notice of Allowance dated Aug. 17, 2015, 2 pages.

* cited by examiner

*Primary Examiner* — Nathan Mitchell
(74) *Attorney, Agent, or Firm* — Lee, Hong, Degerman, Kang & Waimey

(57) ABSTRACT

Provided is a mobile terminal including: a wireless communication unit that receives an event associated with an application; an output unit that outputs alerting information on the event; a display unit to which an alerting image that receives a first touch for activating the application is output; and a controller that, when the alerting image receives a second touch, controls the output unit in such a manner that an alerting mode for reception of the event associated with the application is changed.

16 Claims, 47 Drawing Sheets

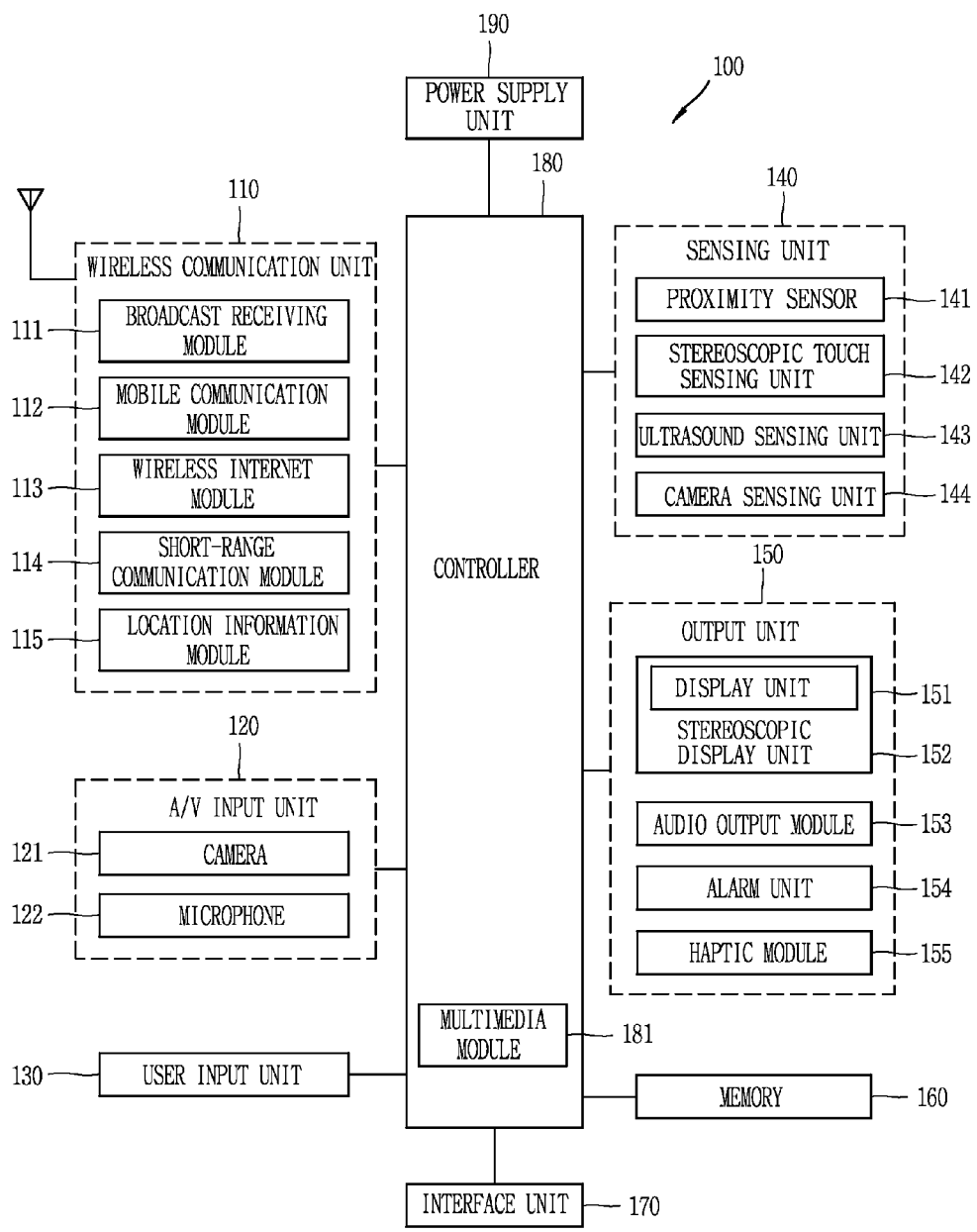

1min later

8min later

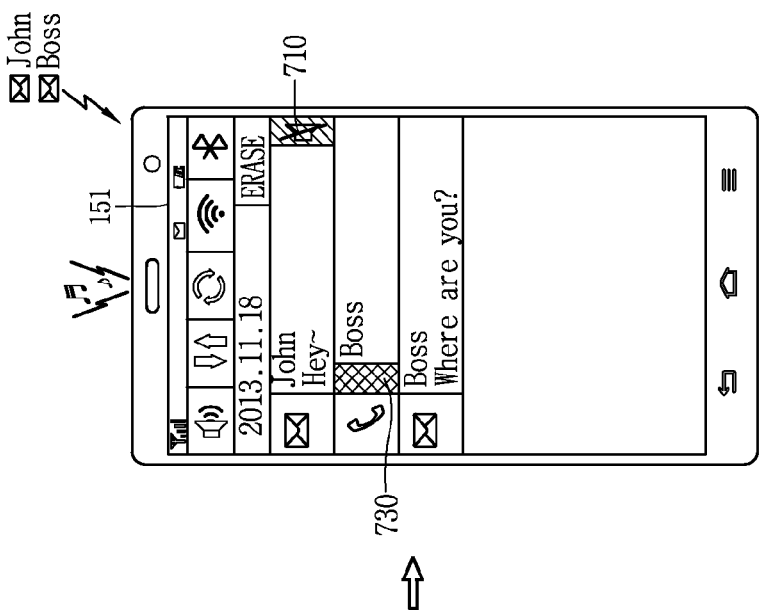
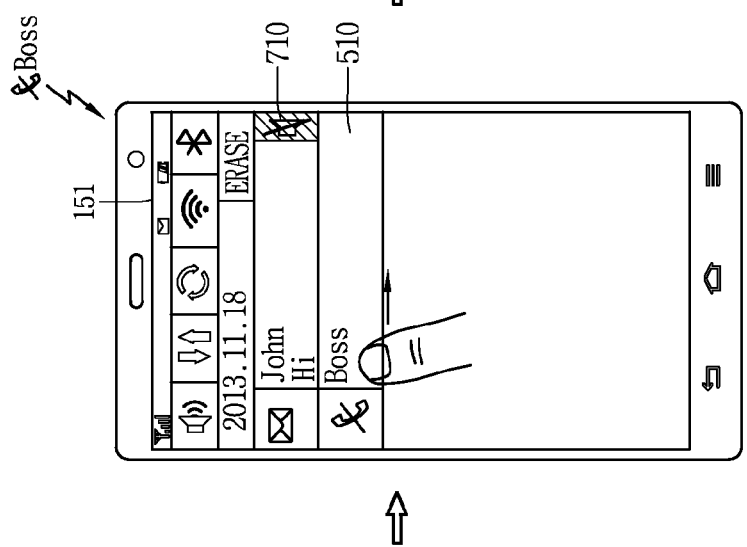
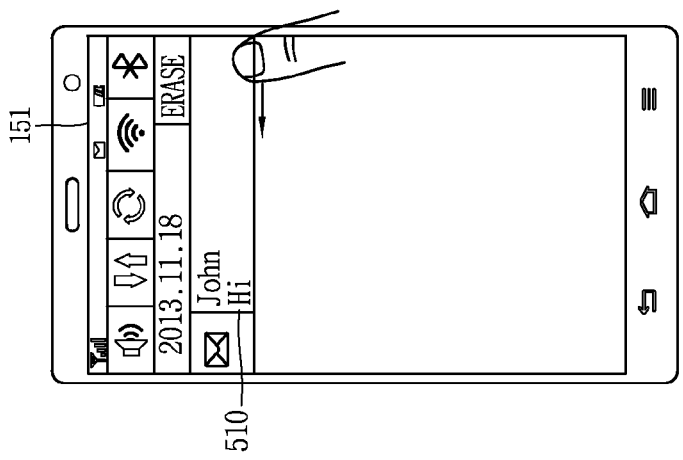

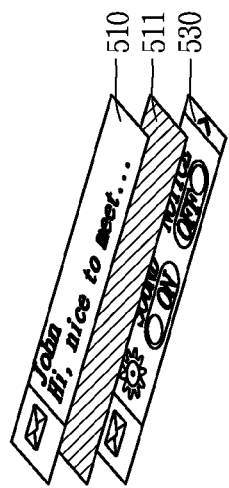
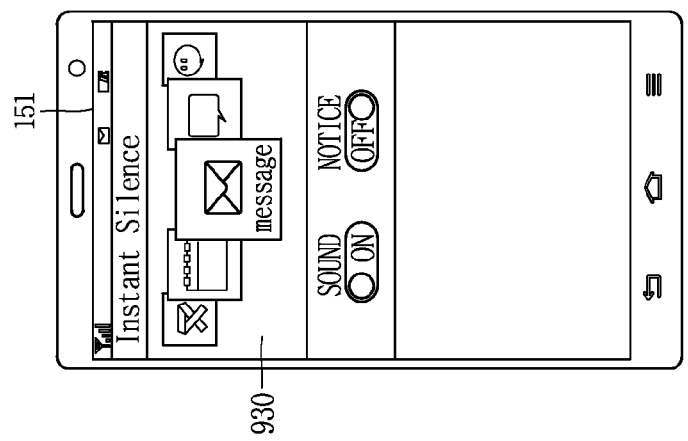
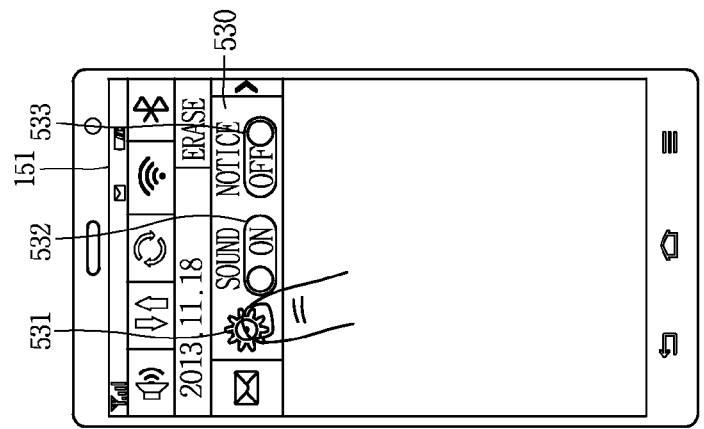
FIG. 14A(c)    FIG. 14A(d)    FIG. 14A(e)

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2013-0156697, filed on Dec. 16, 2013, the contents of which is incorporated by reference herein in its entirety.

BACKGROUND OF THE DISCLOSURE

1. Field of the Disclosure

The present invention relates to a mobile terminal capable of outputting alerting information associated with an event received.

2. Background of the Disclosure

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

Recent mobile terminals run various applications and thus receive an event associated with each of the applications. The mobile terminal outputs alerting information on each of the applications individually. The mobile terminal can output pieces of visual information on the events at a time, based on a user's control command.

The user can change an output mode for the alerting information in the mobile terminal, whenever necessary. In this case, all the pieces of alerting information that are received in the mobile terminal are controlled in the same output mode. Accordingly, the events are difficult to control individually when the mobile terminal is viewed in terms of a system. This causes a user an inconvenience of changing setting of each application to set an individual event alerting mode.

SUMMARY OF THE DISCLOSURE

Therefore, an aspect of the detailed description is to provide a mobile terminal capable of individually setting an alerting mode for an event using an alerting image including visual information on the event.

To achieve these and other advantages and in accordance with the purpose of this specification, as embodied and broadly described herein, there is provided a mobile terminal including: a wireless communication unit that receives an event associated with an application; an output unit that outputs alerting information on the event; a display unit to which an alerting image that receives a first touch for activating the application is output; and a controller that, when the alerting image receives a second touch, controls the output unit in such a manner that an alerting mode for reception of the event associated with the application is changed.

In the mobile terminal, the alerting image may be configured to be in the shape of a bar that extends in one direction, and the controller may set an application range within which a change-resulting alerting mode is applied, based on the continuous second touch that is applied along the one direction of the alerting image.

In the mobile terminal, the controller may control the display unit in such a manner that a timer bar that corresponds to the application range is output to one region of the alerting image.

In the mobile terminal, based on the continuous touch that is applied to the timer bar in a direction perpendicular to the one direction, the controller may select a unit of the application range and the unit of the application range may correspond to one among time, a number of times, and a date.

In the mobile terminal, based on a touch input that is applied to the timer bar, the controller may select a type of alerting mode that is to be applied when the change-resulting alerting mode according to the application range is terminated.

In the mobile terminal, the alerting image may include visual information relating to the event, the timer bar may be output to the display unit in such a manner as to correspond to a touch range of the second touch, and based on a touch input that is applied to the visual information, the controller may temporarily limit the outputting of the timer bar and may control the display unit in such a manner that an output region of the visual information is expanded.

In the mobile terminal, when the multiple events are received, based on a user's control command, a state screen including the multiple alerting images that correspond to the multiple events, respectively, and that are sequentially arranged may be output to the display unit, and the controller may change an output position of the alerting image that receives the second touch, among the multiple alerting images, on the state screen.

In the mobile terminal, based on a user's control command, a state screen including at least one alerting image associated with at least one event may be displayed on the display unit, and the state screen may include an icon that receives a control command to delete the alerting image.

In the mobile terminal, the alerting image may include an icon of the application, and based on a control command that is applied to the icon of the application, the controller may control the display unit in such a manner that the deletion of the alerting image is limited.

In the mobile terminal, based on the control command that is applied to the icon of the application, the controller may select a type of the change-resulting alerting mode.

In the mobile terminal, the state screen may include the multiple alerting images associated with the different events, and based on the second touch that is applied to one alerting image, the controller may change the alerting modes for the events associated with the same application together.

In the mobile terminal, if a touch range of the second touch that is applied to the alerting image along the one direction exceeds a predetermined reference range, the controller may control the display unit in such a manner that the alerting image is deleted.

In the mobile terminal, if the event is data that is received through the wireless communication unit from an external mobile terminal, based on the second touch that is applied in a direction opposite to the alerting image, the controller may set the alerting mode for the event that is received from the external mobile terminal.

In the mobile terminal, based on a touch input that is applied to the alerting image, the display unit may be controlled in such a manner that the alerting image is output to a home screen page, and the home screen page may include an icon of at least one among applications that are arranged according to a predetermined layout.

In the mobile terminal, when setting of the change-resulting alerting mode is terminated, the controller may limit the outputting of the alerting image on the home screen page.

In the mobile terminal, when the event is received in an inactivated state of the display unit, the controller may control the display unit in such a manner that the alerting image is output, and the controller may control the display unit in such a manner that one region of the display unit to which the alerting image is output receives the first and second touches.

In the mobile terminal, based on a touch input that is applied to the alerting image, the controller may control the display unit in such a manner that a setting bar controlling the alerting mode for the application is output.

In the mobile terminal, when the touch input is applied to the alerting image, the controller may output a cover bar with predetermined transparency on the alerting image, and when a touch range of the touch input exceeds a predetermined reference range, the controller may limit the outputting of the cover bar.

According to the present invention, the mobile terminal, the user can assign only the alerting mode for a specific event without changing all the alerting modes for the mobile terminal. Accordingly, the user can set the alerting mode suitable for his/her current situation that varies from one event to another. Accordingly, a problem can be minimized that the alerting of the events that are frequently received disturbs the user's situation.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram illustrating a mobile terminal according to one embodiment described in the present disclosure;

DETAILED DESCRIPTION OF THE DISCLOSURE

Figure 2A:
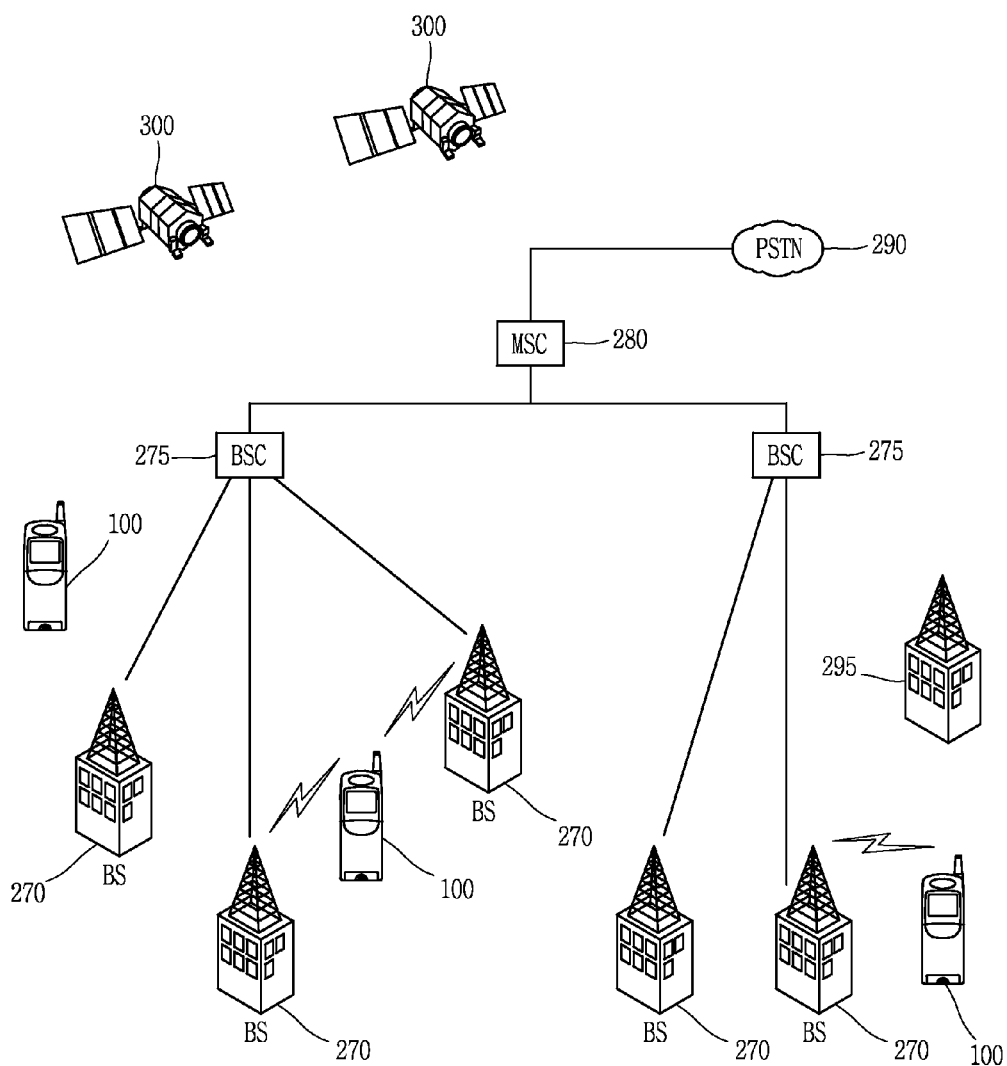
FIG. 2A and FIG. 2B are diagrams, each illustrating a telecommunication system in which the mobile terminal according to the present invention can operate.

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a wireless fidelity (WiFi) module.

Still referring to FIG. 1, the NV input unit 120 is configured to provide audio or video signal input to the mobile terminal. The NV input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2B:
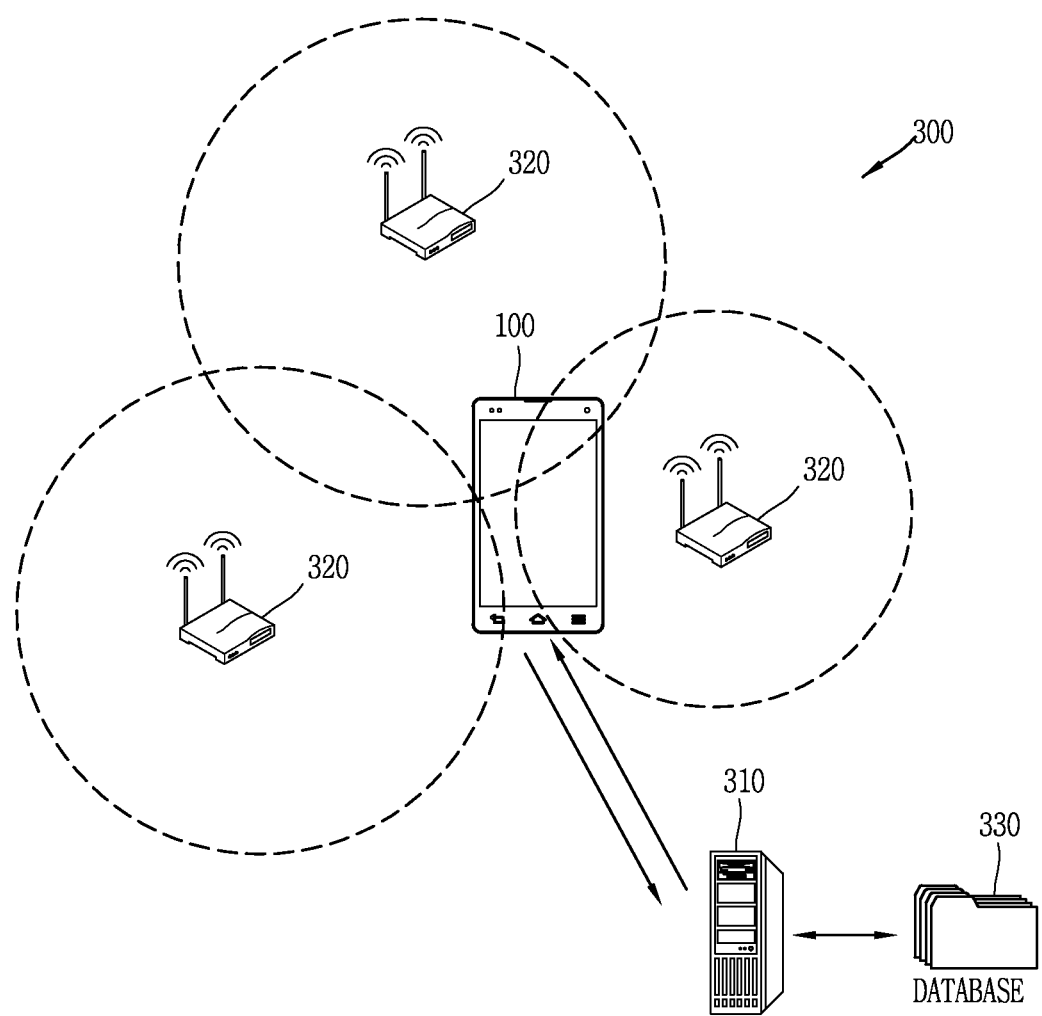

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2A, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 3A:
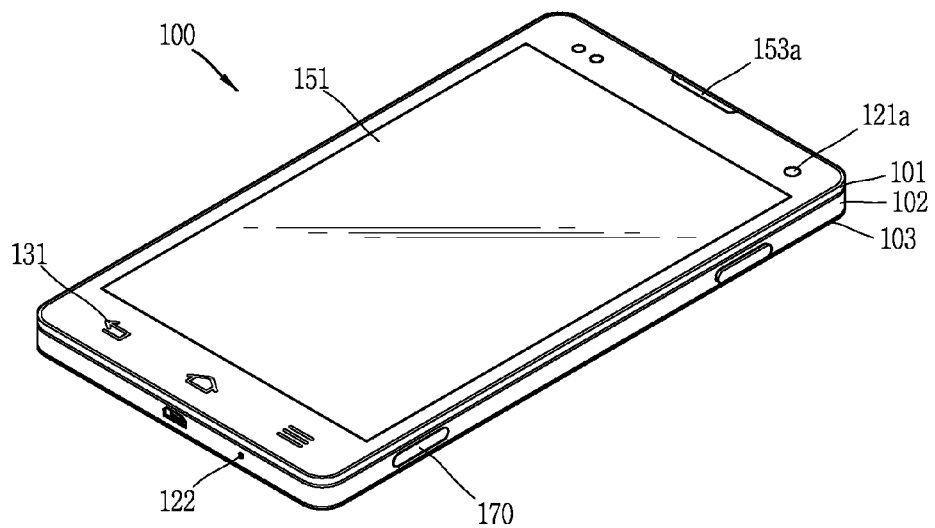
FIG. 3A is a perspective diagram illustrating the mobile terminal according to one embodiment of the present invention when viewed from front.

FIG. 3A is a front perspective view of the mobile terminal 100 according to an embodiment of the present invention.

The mobile terminal 100 according to the present disclosure is a bar type mobile terminal. However, the present disclosure is not limited to this, but may be applied to a watch type, a clip type, a glasses type, or a slide type in which two or more bodies are coupled to each other so as to perform a relative motion, a folder type, or a swing type, a swivel type and the like.

A case (casing, housing, cover, etc.) forming an outer appearance of the body may include a front case 101 and a rear case 102. A space formed by the front case 101 and the rear case 102 may accommodate various components therein. At least one intermediate case may further be disposed between the front case 101 and the rear case 102. A battery cover 103 for covering a battery 191 may be detachably mounted to the rear case 102.

Such cases may be formed by injection-molded synthetic resin, or may be formed using a metallic material such as stainless steel (STS) or titanium (Ti).

At the front case 101, may be disposed a display unit 151, a first audio output unit 153a, a first camera 121a, a first user input unit 131, etc. On the side surfaces, may be disposed a microphone 122, an interface unit 170, a second user input unit 132, etc.

The display unit 151 may output information processed in the mobile terminal 100. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
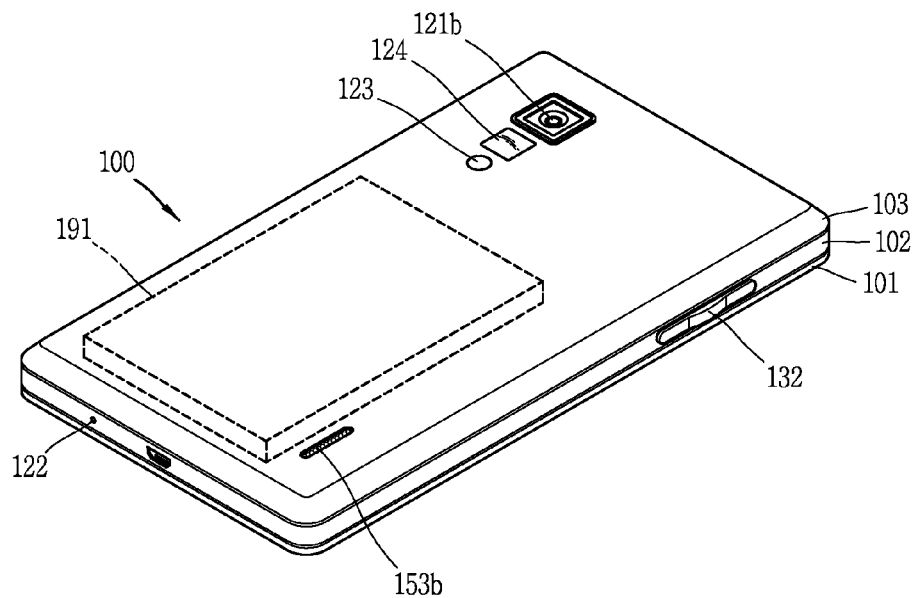
FIG. 3B is a perspective diagram of the mobile terminal illustrated in FIG. 3A when viewed from rear.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Figure 4:
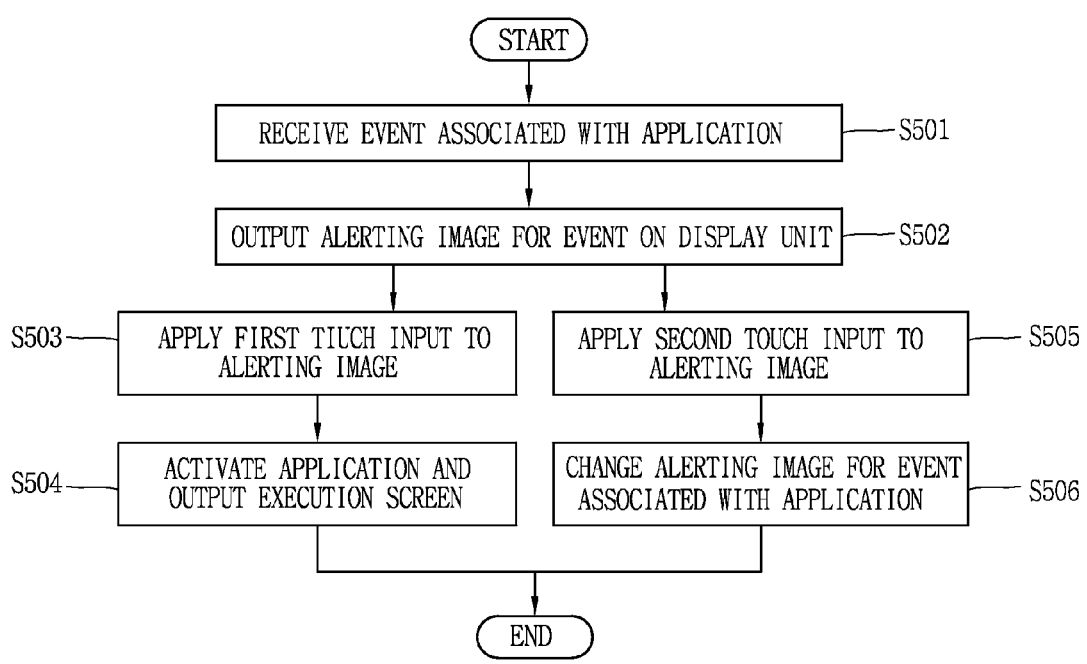
FIG. 4 is a flow chart for describing a method of controlling a mobile terminal according to one embodiment of the present invention.
Figure 5A:
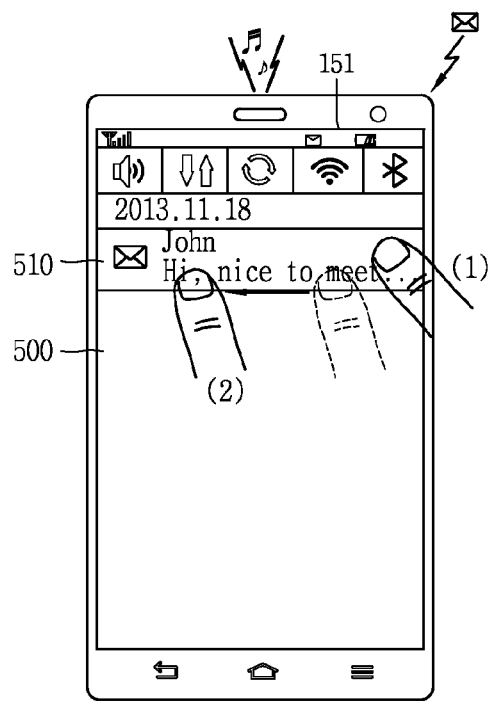
FIGS. 5A to 5D are diagrams for describing the control method according to one embodiment of the present invention in FIG. 4.
Figure 5B:
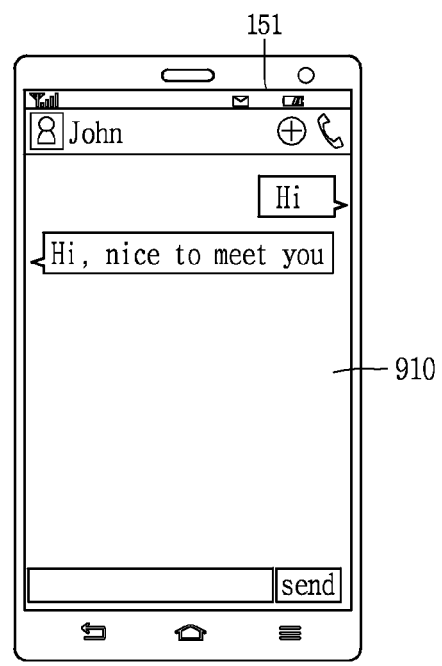
Figure 5C:
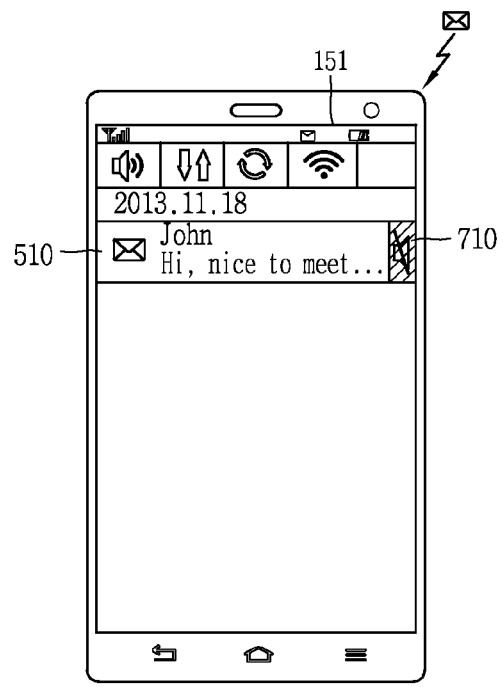
Figure 5D:
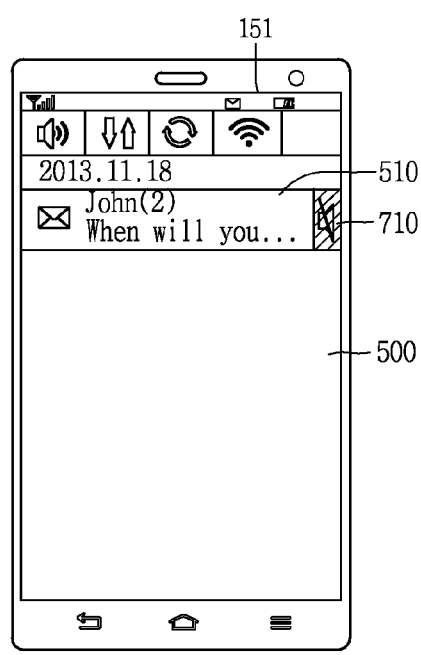

FIG. 4 is a flow chart for describing a method controlling a mobile terminal according to one embodiment of the present invention. FIG. 5 is a diagram for describing the control method according to one embodiment of the present invention in FIG. 4.

Referring to FIGS. 4 and 5, the mobile terminal receives an event (S501). The events here include data that is transmitted from the outside and is to be received through the wireless communication unit 110 and stored data that is to be output by a user or a manufacturer of the mobile terminal. When the event is received, the output unit outputs data relating to the event. For example, the sound output unit 153 outputs alerting audio that alerts the user to the reception of the event, and the haptic module 155 is activated to alert the user to the reception of the event.

An alerting image 510 associated with the event and the like are output to the display unit 151. For example, at this point, the alerting image 510 includes information for alerting the user to the reception of the event, for example, such as an icon of an application associated with the event, summarized information on the event, the time at which the event was received, or the like. As illustrated in the drawings, the image corresponds to a notification bar.

Although not specifically illustrated in the drawings, the controller 180 controls the display unit 151 in such a manner that when the event is received, an icon relating to the event is output to a state bar that corresponds to an uppermost end of the display unit 151. For example, a state screen 500 including the alerting image 510 is output to the display unit 151, based on a touch input that is applied to the state bar. When the received event is not present, based on the touch input that is applied to the state bar, the controller 180 controls the display unit 151 in such a manner that the state screen that does not include the alerting image 510 is output.

The alerting images 510 of which the number corresponds to the number of received events are output. If applications associated with the received event overlap, one alerting image 510 for every application is output to the display unit 151. The alerting image 510 is formed in the shape of a bar in one direction.

Referring to FIGS. 5(*a*) and 5(*b*), based on a first touch input(1) that is applied to the alerting image 510 (S503), the controller 180 activates an application corresponding to the alerting image 510 and controls the display unit 151 in such a manner that an execution screen 910 of the application is output (S504). It is desirable that the execution screen 910 include visual information on the event.

On the other hand, referring to FIGS. 5(*a*), 5(*b*), and 5(*d*), when a second touch input(2) distinguishable from the first touch input(1) is applied to the alerting image 510, the controller 180 changes an alerting mode for the event.

At this point, the second touch input corresponds to a dragging-type touch input in which the touch is dragged in the one direction. For example, when the second touch input is applied to the alerting image 510, the controller 180 changes an alerting mode for the application corresponding to the alerting image 510. The second touch input, if distinguishable from the first touch input, is not limited in touch type.

If an alerting mode for the mobile terminal is set to an audio mode, control is performed in such a manner that only when receiving only an event associated with the application that corresponds to the alerting image 510 to which the second touch input is applied, a mute mode is set and thus, only time data is output without producing audio or vibration.

However, the controller 180 applies the visual mode to only one or more predetermined events among the events associated the application. For example, the mute mode is applied to only one or more events among an event for alerting the user to information relating to an application (for example, update information, error information on an application system, or the like), an event that is received from an external mobile terminal and is formed in such a manner that the event is executed through the application, and the like, which are the events associated with the application.

In addition, the controller applies the change-resulting mode to only an event that is received from a specific external terminal, among events that are received from the external mobile terminal.

On the other hand, if the event is a date that is received through the wireless communication unit from the specific external mobile terminal, based on the second touch input, the controller 180 sets the alerting mode only for the event received from the specific external mobile terminal to the mute mode.

That is, if the event associated with substantially the same application or the event that is received from substantially the same external mobile terminal is received, the controller 180 limits outputting of the vibration or the audio, and performs control in such a manner that the time data relating to the event is outputs to the display unit 151.

If the alerting mode is changed, the controller 180 controls the display 151 in such a manner that a mode image 710 is output on the alerting image 510. For example, if with the second touch, the alerting mode is changed to the mute mode, a mode image 710 indicating the mute mode is output to the display unit 151.

Although not specifically illustrated in the drawings, if in the audio mode, the event associated with the application is received or the event is received from a different external mobile terminal, the controller 180 controls the sound output unit 153 in such a manner that alerting audio associated with the received event is output.

According to the present embodiment, the mobile terminal, the user can assign only the alerting mode for a specific event without changing all the alerting modes for the mobile terminal. Accordingly, the user can set the alerting mode suitable for his/her current situation that varies from one event to another.

Accordingly, a problem can be solved that the alerting of the events that are frequently received disturbs a user's situation.

Figure 6A:
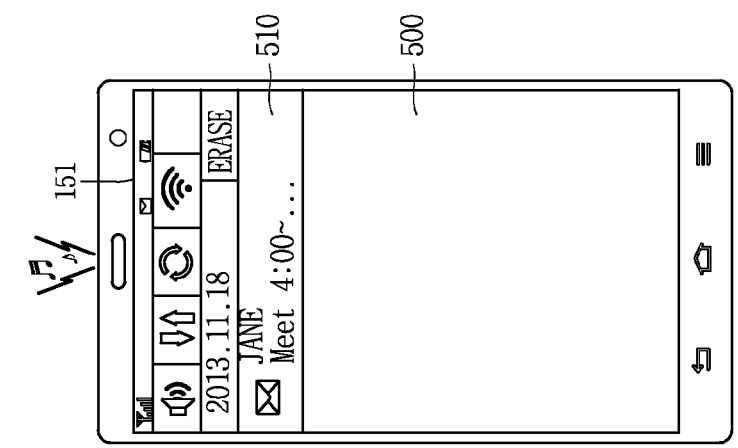
FIGS. 6A(a) to 6B(d) are diagrams for describing a method of controlling a change made to an alerting mode according to deletion of an alerting image.
Figure 6A:
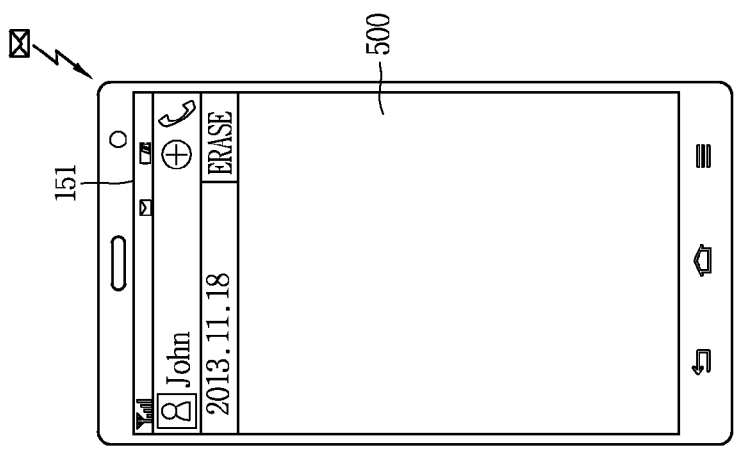
Figure 6A:
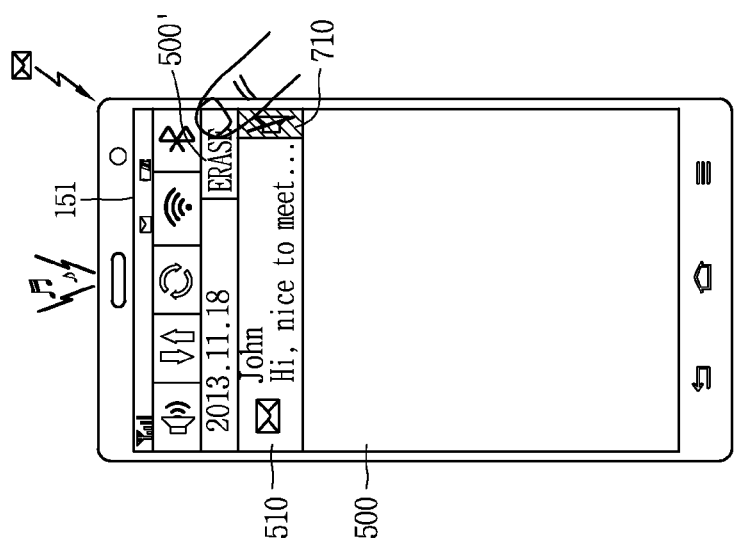

FIGS. 6A(a) to 6A(c) and 6B(a) to 6B(d) are diagrams for describing a method of controlling the change made to the alerting mode according to the deletion of the alerting image.

Referring to FIG. 6A(a) to 6A(c), the control method of canceling the change made to the alerting mode is described. Referring to FIG. 6A(a), based on the second touch input that is applied to the alerting image 510, the controller 180 switches the alerting mode for the event to the mute mode, and the alerting image 710 is displayed on the display unit 151.

The state screen 500 includes a deletion icon 500' to which the touch input is applied to delete from the state screen 500 the alerting image 510 that is output. If the state screen 500 includes at least one alerting image 510, based on the touch input that is applied to the deletion icon 500', the controller 180 controls the display unit 151 in such a manner that all the alerting images 510 are deleted.

However, because the event associated with each of the applications is stored in the memory 160, the deletion of the alerting image 510 does not lead to deleting the event itself from the memory 160. For example, if a message arrives, although the alerting image 510 for the message is deleted, a message application is activated to check the message. In addition, if an icon and the like that correspond to each alerting image 510 are displayed on the state bar, when the deletion icon 500' receives the touch input, the controller 180 controls the display unit 151 in such a manner that outputting of the icons is limited.

Based on the touch input that is applied to the deletion icon 500', the controller 180 cancels the change to alerting mode that is applied independently to the event. For example, if the mute mode is applied to the event, the controller 180 performs control in such a manner that the alerting image 510 is deleted from the state screen 500 and the applied mute mode is canceled. Therefore, if the event is received, the controller 180 controls the sound output unit 153 in such a manner that the alerting audio is output according to the alerting mode for the mobile terminal.

That is, the user can more easily cancel the change-resulting alerting mode using the deletion icon 500' that is included in the state screen 500.

Figure 6B:
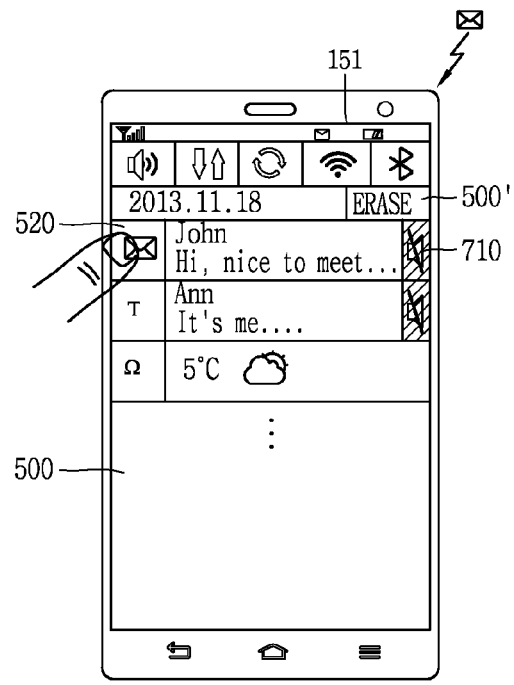
Figure 6B:
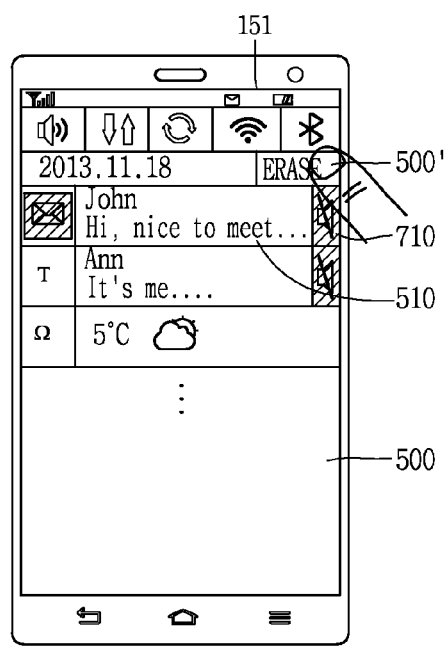
Figure 6B:
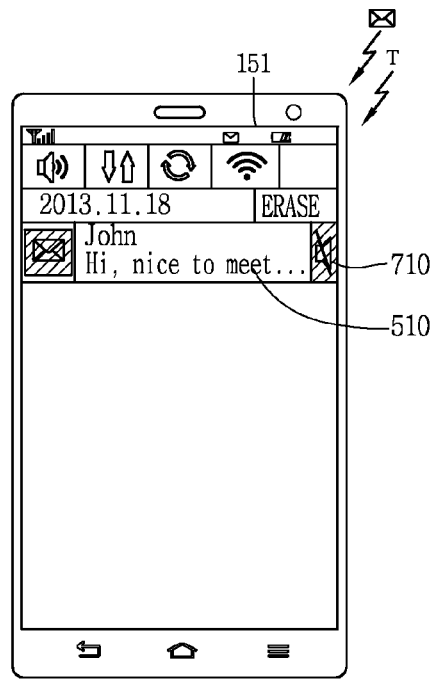
Figure 6B:
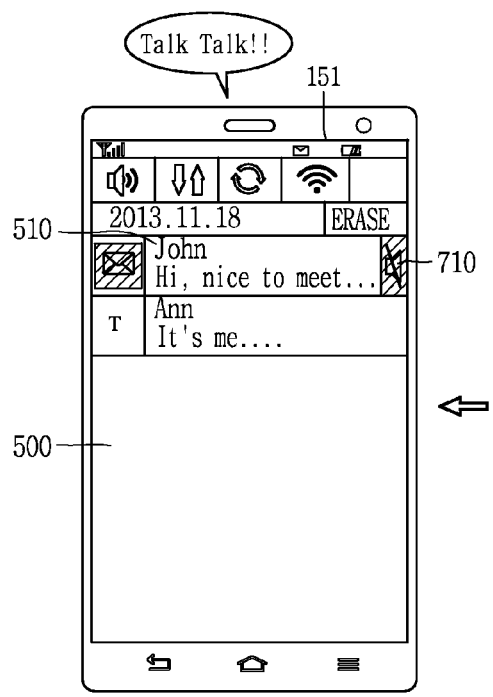

Referring to FIGS. 6B(a) to 6B(d), a control method of selectively deleting the alerting image 510 for the event for which the alerting mode is changed. Referring to FIG. 6B(a), the alerting image 510 includes an icon 520 of an application that corresponds to the event and receives the user touch input.

As illustrated in FIGS. 6A(a) to 6A(c), based on the touch input applied to the deletion icon 500', the controller 180 deletes all the images 510 that are included in the state screen 500, and cancels the alerting mode that is applied to each of the alerting image 510.

However, based on the touch input that is applied to the icon 520 of the application, the controller 180 limits the deletion and the cancellation of the alerting image.

Referring to FIGS. 6B(a) and 6B(b), when the touch input is applied to the icon 520 of the application, the controller 180 controls the display unit 151 in such a manner that a form of the icon 520 is changed and thus is output. For example, a color, a shape, and the like of the icon 520 are changed and thus output.

Referring to FIGS. 6B(b) and 6B(c), if the touch input is applied to the icon 520 and then the touch input is applied to the deletion icon 500', the controller 180 limits the deletion of the alerting image 510, for which the icon 520 receives the touch input. In addition, the controller 180 also limits the cancellation of the alerting mode that is set for the alerting image 510. Therefore, the alerting images are deleted from the display unit 151, except for the alerting image 510 with the touch input being applied to the icon 520

Referring to 6B(d), if the deletion-limited event associated with the application is received, based on the alerting mode that is set for the alerting image 510, the controller 180 perform control in such a manner that the time data is output to the display unit 151. However, if the event is received that corresponds to the alerting image that is deleted from the state screen 500 based on the touch input that is applied to the deletion icon 500', based on the audio mode, the sound output unit 153 is controlled in such a manner that the audio data is output.

Accordingly, the user can selectively cancel one or more, among the change-resulting alerting modes, in the state screen including the multiple alerting images.

Figure 7A:
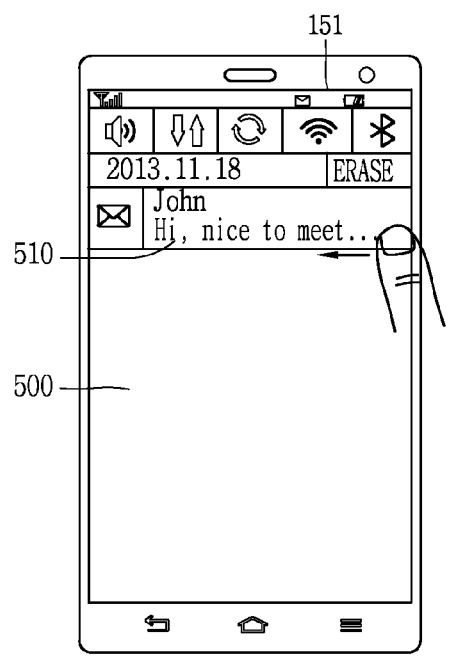
FIGS. 7A(a) to 7E(d) are diagrams for describing a control method of controlling an application range of a change-resulting alerting mode.
Figure 7A:
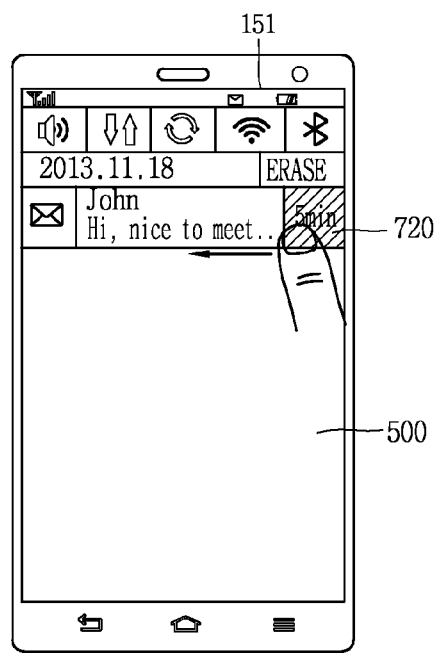
Figure 7A:
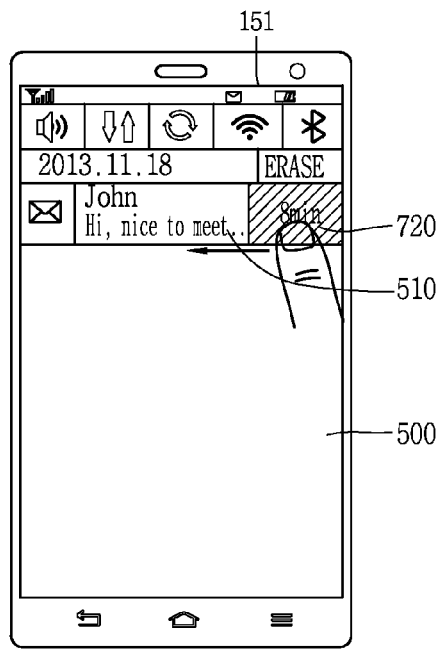
Figure 7A:
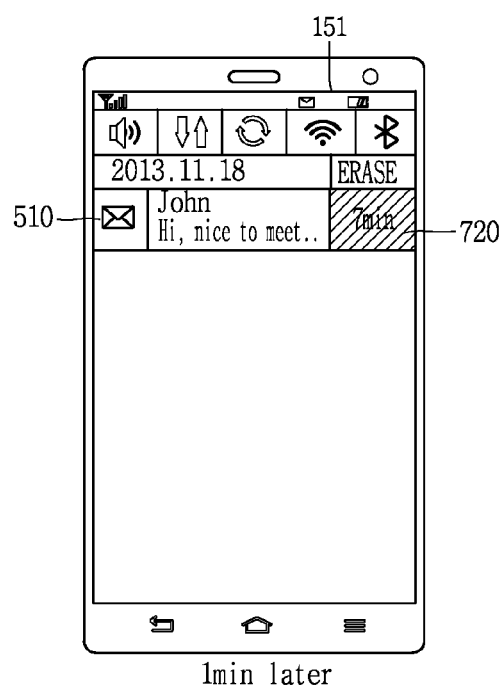

FIGS. 7A(a) to 7E(d) are diagrams for describing a control method of controlling an application range of the change-resulting alerting mode.

Referring to FIGS. 7A(a) to 7A(d), a control method of setting the application range of the alerting mode is described. Referring to FIGS. 7A(a) and 7A(b), the controller 180 sets the application range of the changing-resulting alerting mode, corresponding to a continuous touch input that is dragged in one direction on the alerting image 510.

For example, the controller 180 sets the application range in such a manner as to correspond to a range over which the continuous touch input is dragged. Referring to FIGS. 7A(b) and 7A(c), with the touch input that is dragged in opposite directions on the alerting image 510, the controller 180 increases or decreases the application range. Based on the touch input that is dragged from a right corner of the mobile terminal on the drawings to a left corner, the application range is increased. Conversely, based on the touch input that is dragged back to the left corner, the application range is decreased. The controller 180 sets the time at which the touch input is released, as the application range of the alerting mode.

In addition, while the touch input is applied, one region of the alerting image 510 to which the touch input is applied is changed in shape and thus is output to the display unit 151.

In addition, the controller 180 controls the display unit 151 in such a manner that a timer bar 720 based on the range over which the touch input is dragged is output to one region of the alerting image 510 on the display unit 151.

Based on the change-resulting alerting mode, the controller 180 outputs data on the received event within the application range. In addition, the controller 180 controls the display unit 151 in such a manner that the timer bar 720 is changed in shape with the passage of time. If the application range corresponds to time, on the display unit 151, a numerical value of the decreasing application range is changed with the passage of time, and the alerting image 510 that is changed in shape is restored according to the range of the touch input. That is, the controller 180 controls the display unit 151 in such a manner that when the application range that is set is decreased to zero, the timer bars 720 all disappear from the alerting image 510.

Accordingly, the user can easily set the time at which the alerting mode will be applied, using the alerting image, and can check the remaining time while the alerting mode is activated.

Figure 7B:
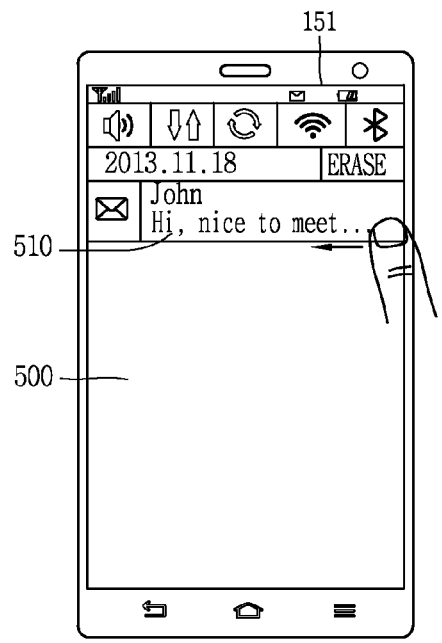
Figure 7B:
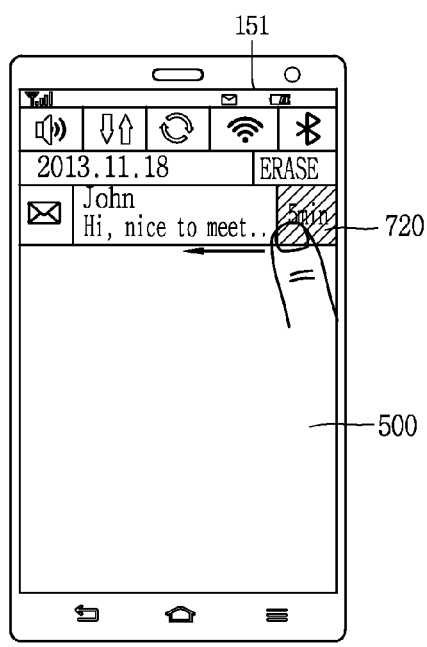
Figure 7B:
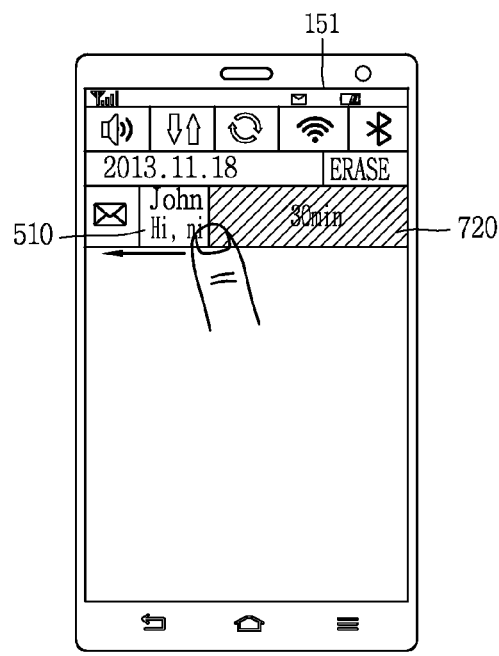
Figure 7B:
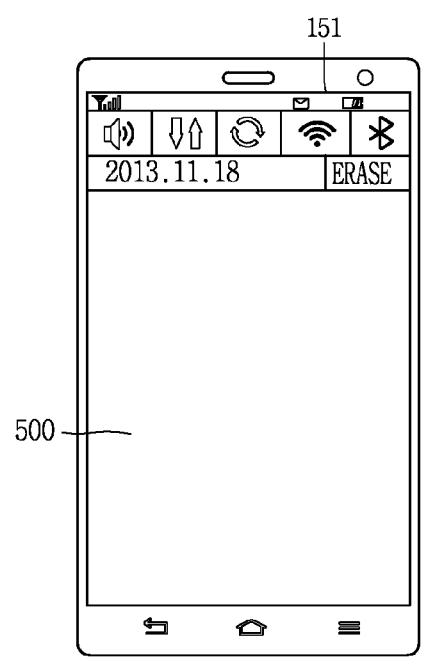

Referring to FIGS. 7B(a) to 7B(d), a method of controlling different functions based on a range over which the touch is dragged on the alerting image is described. As illustrated in FIGS. 7A(a) to 7A(d), the controller 180 sets the application range that corresponds to the range over which the touch is dragged on the alerting image 510.

However, as is illustrated in FIGS. 7B(c) and 7B(d), if the touch range exceeds a predetermined reference range, the controller 180 controls the display unit 151 in such a manner that the alerting image 510 is deleted from the state screen 500.

Specifically, based on the range over which the touch is dragged on the alerting image 510, the controller 180 controls the display unit 151 in such a manner that the timer bar 720 is output. If the touch input is released in a state where the touch range exceeds the reference range, the controller 180 controls the display unit 151 in such a manner that the outputting of the alerting image 510 is limited.

On the other hand, if the touch input is dragged in the opposite direction to the one direction and thus the timer bar 720 is decreased in size and the timer bar 720 is formed to be narrower than the reference range, the controller 180 sets the alerting mode using the reference range.

That is, with the continuous touch input that is applied to the alerting image 510, the controller 180 performs control in such a manner that the alerting mode is applied or the alerting image is deleted.

Figure 7C:
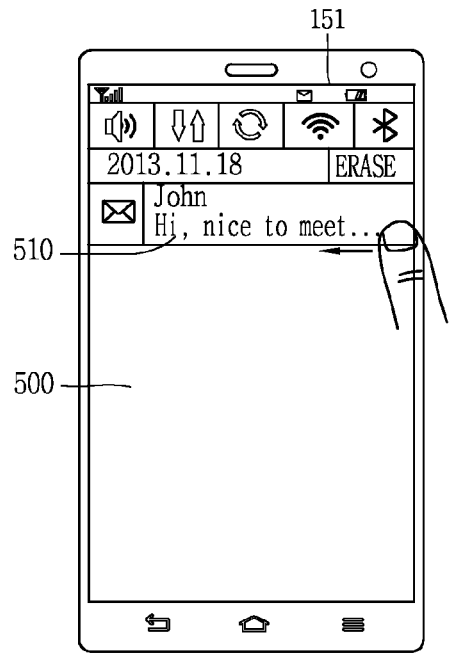
Figure 7C:
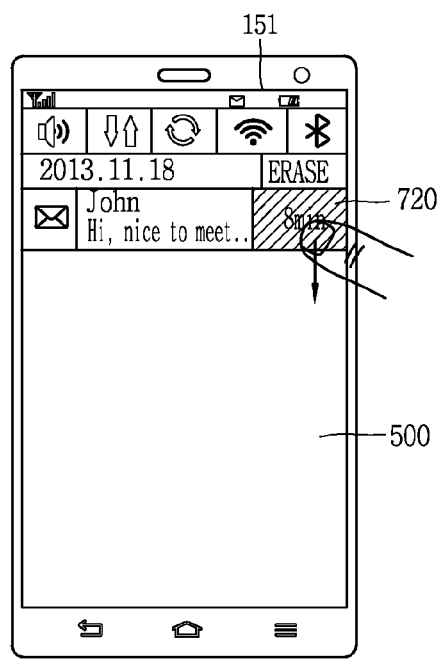
Figure 7C:
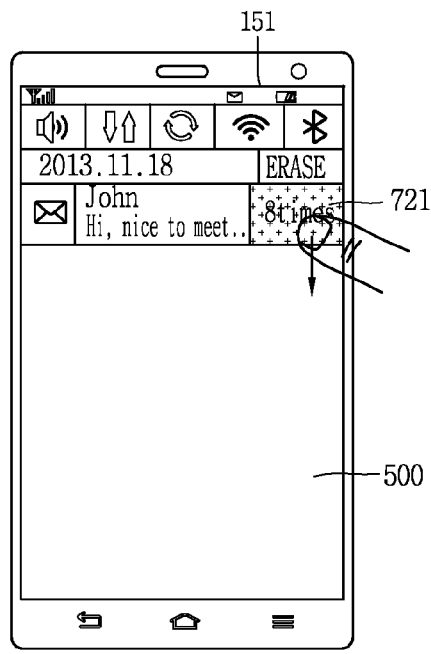
Figure 7C:
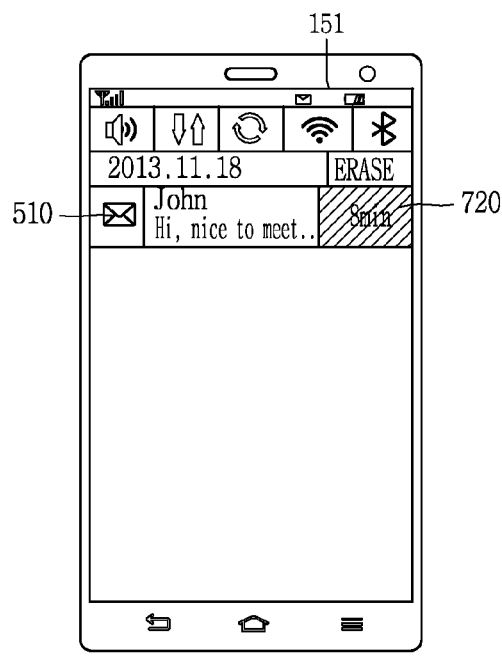

Referring to FIG. 7C, a control method of setting a unit of the application range is described. Based on the touch input that is applied to the alerting image 510, the controller 180 sets the alerting mode and the application range. The timer bar 720 according to the application range is output to the display unit 151.

Based on a third touch input that is applied to the timer bar 720, the controller 180 changes the unit of the application range. For example, the units of the application range include a number of times that the event is received, a date on which the event is received, and the like. Specifically, if the number of times that the event is received is assigned and the event is received exceeding the assigned number of times, the alerting mode that is set is canceled.

It is desirable that the third touch input distinguishable from the second touch input be a touch input in a direction perpendicular to the one direction, but a limit to this is not imposed. For example, the third touch input corresponds to a long though, a flipping-type touch input, or the like.

When the unit of the application range is changed, a timer bar 721 different in shape is output to the display unit 151. The timer bar 721 different in shape includes a numerical value in the unit described above, or an image or a color that is different from the previous one is applied to the timer bar 721.

Accordingly, the alerting mode is set to be in the application range suitable for the user's situation.

Figure 7D:
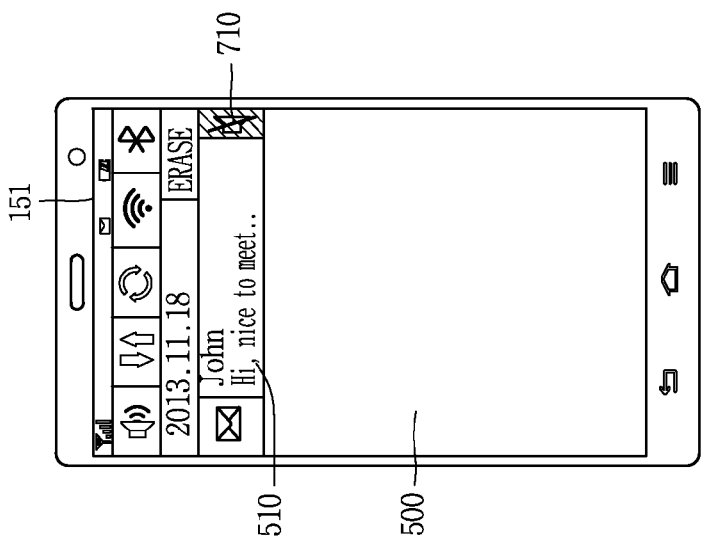
Figure 7D:
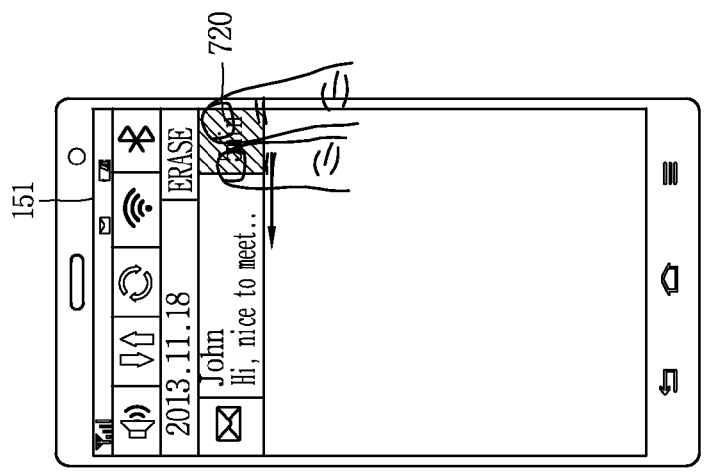
Figure 7D:
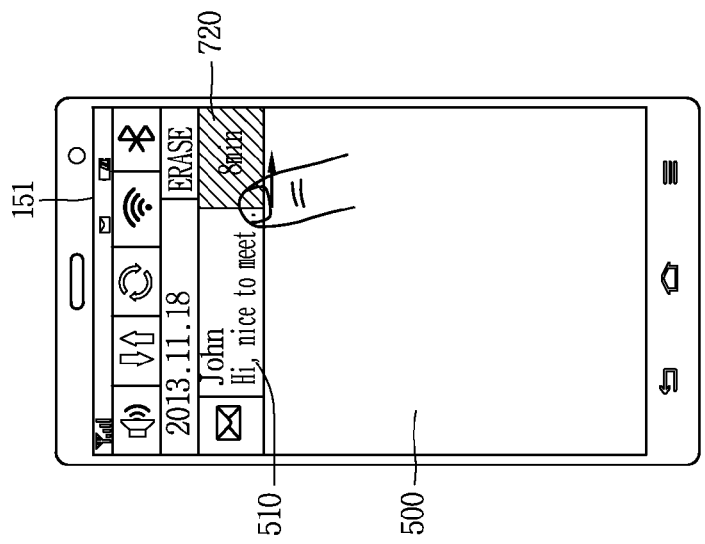

Referring to FIGS. 7D(a) to 7D(c), a control method of canceling the application range is described. As illustrated in FIGS. 7A(a) to 7A(d), based on the touch input that is applied to the alerting image 510, the controller 180 sets the alerting mode that includes the application range. Alternatively, as illustrated in FIGS. 5A to 5D, based on the touch input that is applied to the alerting image 510, the controller 180 sets the alerting mode without the application range.

According to the present embodiment, a control method of canceling the alerting range while a setting state of the alerting mode is described. Specifically, the controller 180 applies the touch input to the alerting image 510 in the opposite direction and thus decreases the application range.

Referring to FIGS. 7D(b) and 7D(c), when a fourth touch input to the timer bar 720, the controller 180 performs control in such a manner that a change to the alerting mode with the application range is caused. At this point, the fourth touch input corresponds to the dragging-type touch input, as a multi-touch that is applied to the timer bar 720.

In addition, the controller 180 controls the display unit 151 in such a manner that the timer bar 720 is changed to the alerting mode image 710.

Figure 7E:
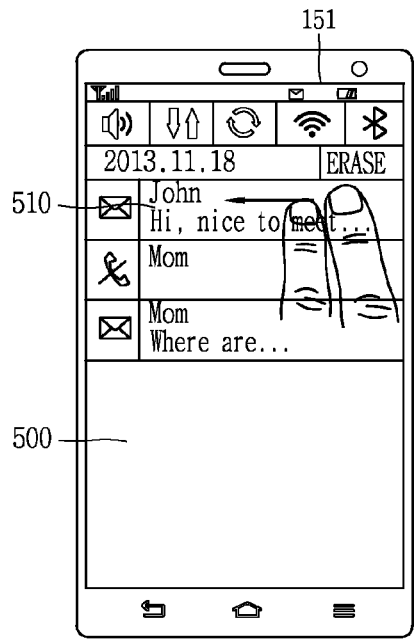
Figure 7E:
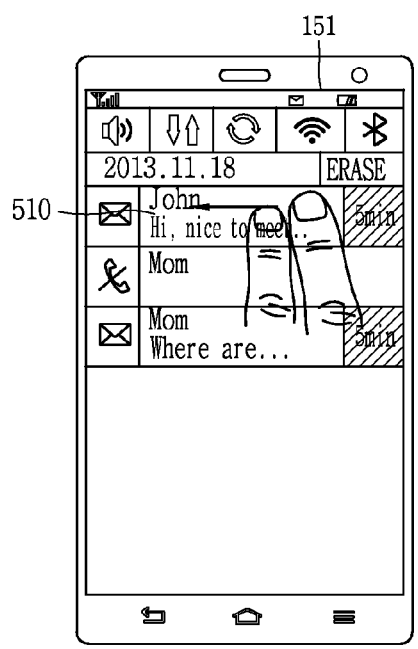
Figure 7E:
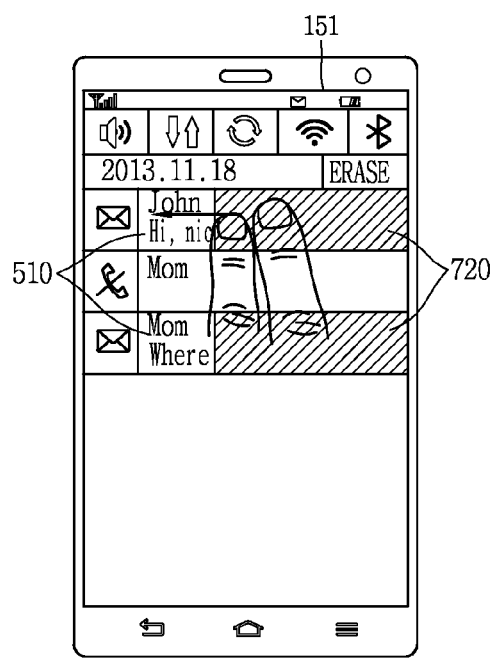
Figure 7E:
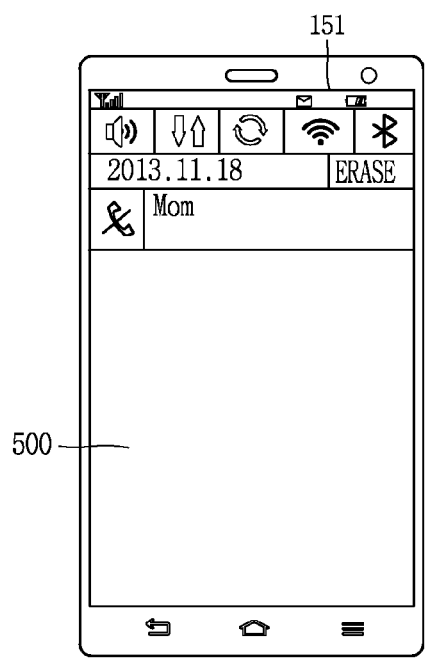

Referring to FIGS. 7E(a) to 7E(d), a control method of setting the alerting mode for the multiple events at the same time. Referring to FIG. 7E(a), the controller 180 outputs the alerting image 510 according to each of the received events. For example, although the event is an event associated with substantially the same application, the controller 180 outputs the events as the individual alerting images. In addition, the controller 180 controls the display unit 151 in such a manner that although the events that are received from different external terminals are the same event associated with the same application, the events are output as the individual alerting images. In the drawings, a message received from JOHN and a message received from MOM, which are the events associated with the message application, are output as the individual alerting images.

As illustrated in FIGS. 7E(b) and 7E(c), based on a fifth touch input that is applied to the alerting image 510, the controller 180 sets the alerting modes for the alerting images together that are regarded as being associated with one another among the multiple alerting images.

For example, the fifth touch input corresponds to multi-touch inputs in which with two fingers, the touch inputs are applied to the alerting image 510 at the same time. When the dragging-type touch input is dragged in the one direction with the multi-touch inputs being applied, the controller 180 sets the application range to be for the alerting mode for the multiple events associated with the application corresponding to the alerting image 510, at the same time. The timer bar 720 is output on the multiple alerting images 510 to which the alerting mode is applied, on the display unit 151.

Referring to FIGS. 7E(c) and 7E(d), if the range over which the fifth touch input is dragged exceeds the reference range, the controller 180 controls the display unit 151 in such a manner that the multiple alerting images 510 are deleted.

That is, the user can set the alerting mode for the multiple events associated with one another and can control the multiple alerting images together.

Figure 8A:
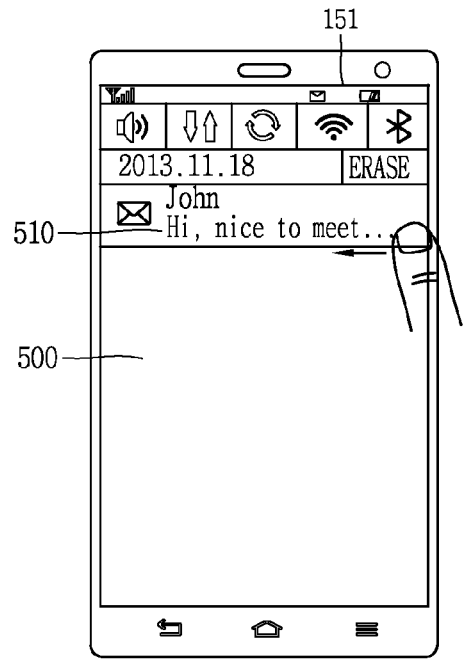
FIGS. 8A(a) to 8C(d) are diagrams for describing a control method of changing a type of alerting mode that is set.
Figure 8A:
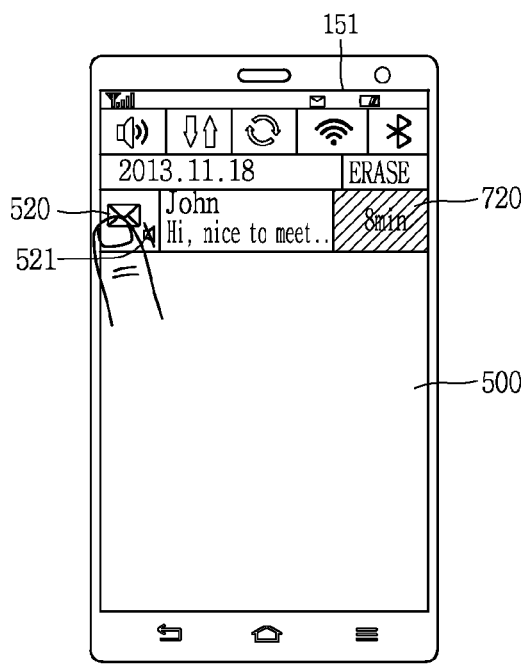
Figure 8A:
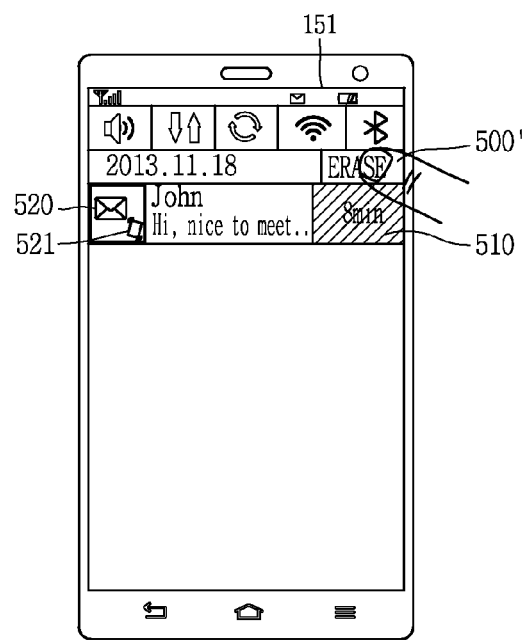
Figure 8A:
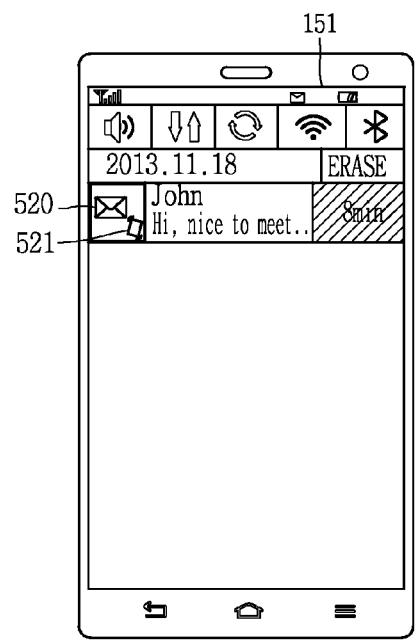

FIGS. 8A(a) to 8C(d) are diagrams for describing a control method of changing a type of alerting mode that is set.

Referring to FIGS. 8A(a) to 8C(d), the control method of changing the type of alerting mode according to the alerting mode for the mobile terminal. Based on the touch input that is applied to the alerting image 510, the controller 180 sets the change-resulting alerting mode including the application range.

If the alerting mode for the mobile terminal is the audio mode, based on the touch input that is applied to the alerting image, the controller 180 sets the alerting mode to the mute mode.

Based on the touch input that is applied to the icon 520 of the application, the controller 180 changes the alerting mode that is set for the event. For example, if the alerting mode for the mobile terminal is the audio mode, based on the touch input that is applied to the icon 520, the controller 180 performs control in such a manner that the alerting mode is switched to a vibration mode (mode in which when the event is receive, a haptic module generates vibration).

In addition, an alerting mode icon 521 according to the type of alerting mode is output adjacent to the icon 520 of the application on the display unit 151. Based on the touch input that is applied to the icon 520 of the application (or to the alerting mode icon 521), the controller 180 controls the display unit 151 in such a manner that not only the alerting mode, but also the alerting mode icon 521 is changed.

Accordingly, the user can select the desired alerting mode and at the same time, can check the type of alerting mode that is applied to the event.

In addition, if the touch input is applied to the icon 520 of the application, the deletion icon 500' limits the deletion on the state screen 500 by the controller 180.

Figure 8B:
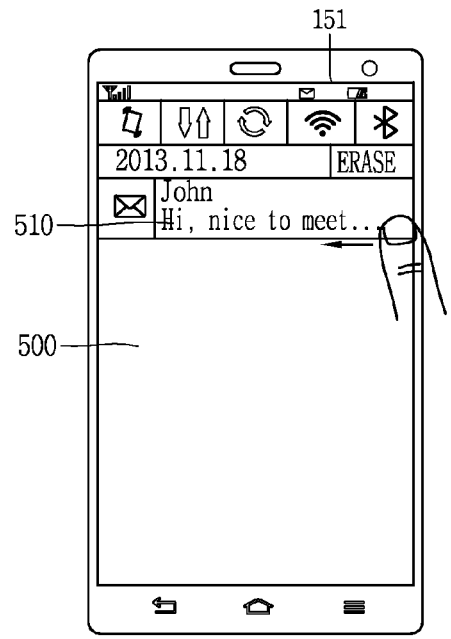
Figure 8B:
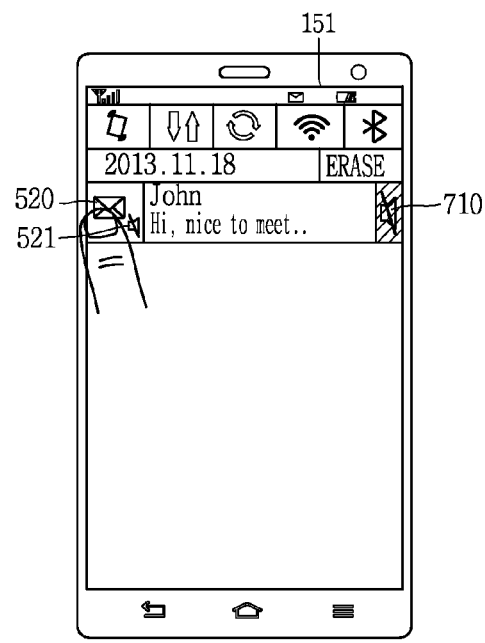
Figure 8B:
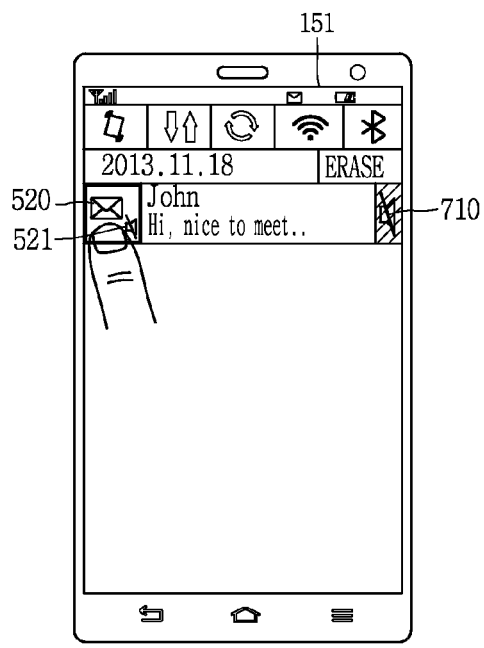
Figure 8B:
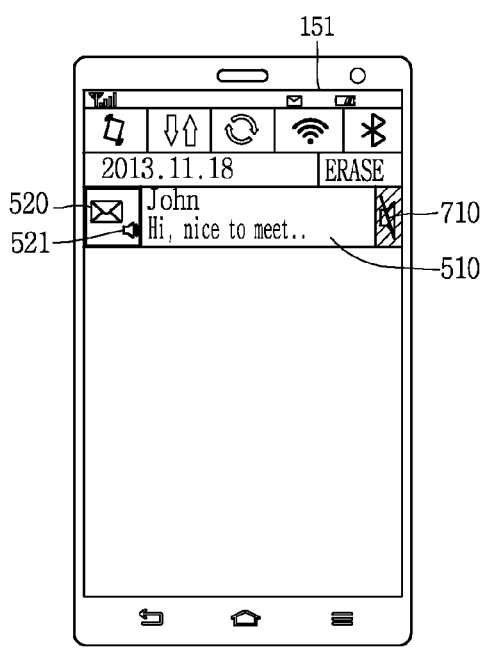

The setting of the alerting mode including the application range is described above as one example, but a limit to this is not imposed. Referring to FIGS. 8B(a) to 8B(d), a control method of changing the alerting mode not including the application range is described. According to the present embodiment, as one example, a case where the alerting mode for the mobile terminal is the vibration mode is described.

Based on the touch input that is applied to the alerting image 510, the controller 180 sets the alerting mode for the event, and controls the display unit 151 in such a manner that the alerting mode icon 521 corresponding to the alerting mode is output.

Based on the touch input that is applied to the icon 520 of the application (or to the alerting mode icon 521), the controller 180 changes the type of alerting mode. For example, the controller 180 changes the type of alerting mode to the audio mode.

That is, the user can set the alerting mode for the selected event to a different type of alerting mode from the type of alerting mode for the mobile terminal.

Figure 8C:
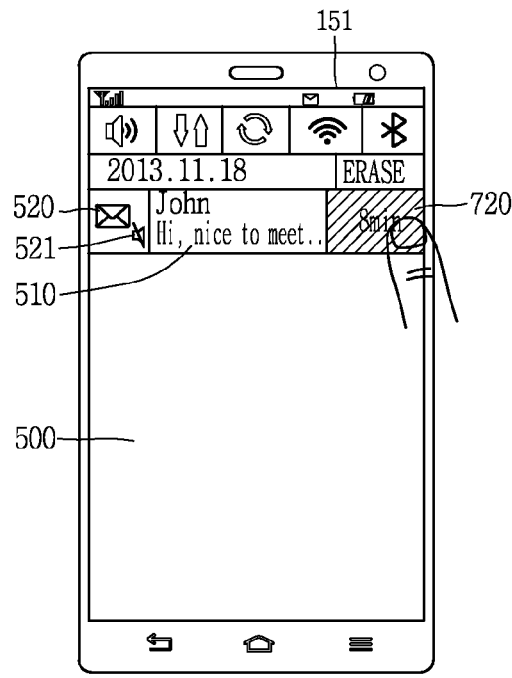
Figure 8C:
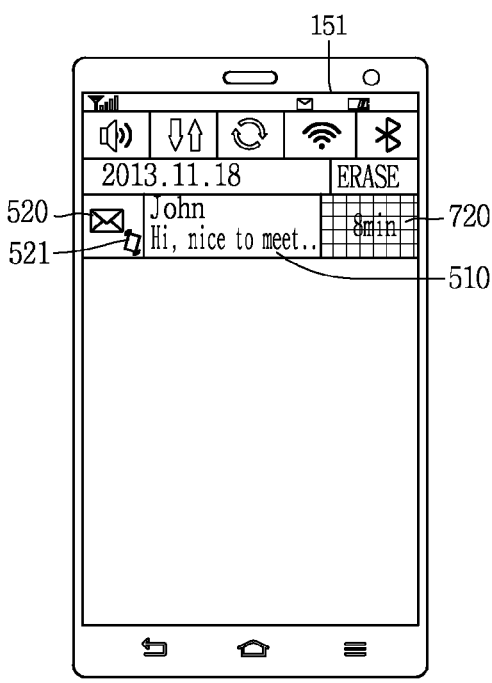
Figure 8C:
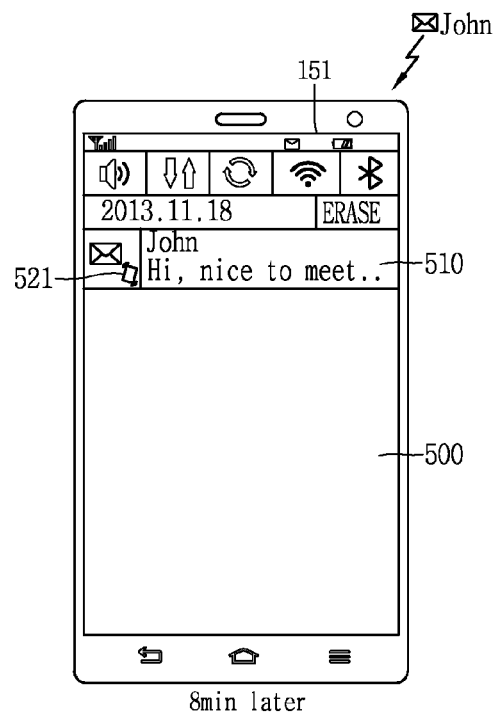
Figure 8C:
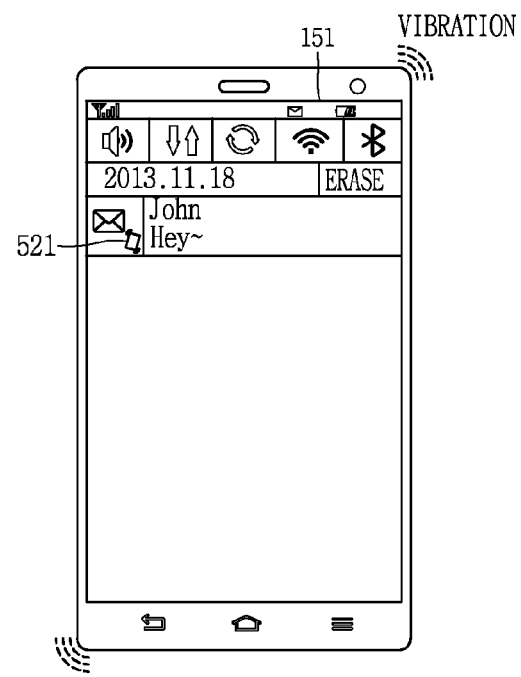

Referring to FIGS. 8C(a) to 8C(d), a control method of setting the alerting mode that is applied after the application range is exceeded is described. Referring to FIGS. 8C(a) and 8C(b), based on the touch input that is applied to the timer bar 720, the controller 180 assigns the alerting mode that is applied after the application range is exceeded.

That is, by applying the continuous touch input to the timer bar 720, the user can select the type of alerting mode that is applied after the alerting mode that is set. Based on the touch input that is applied to the timer bar 720, the controller 180 changes and outputs the type of timer bar 720 according to the type of alerting mode that is switched. In addition, the alerting mode icon 521 is changed in such a manner as to correspond to the change-resulting alerting mode.

Referring to FIGS. 8C(c) and 8C(d), when the application range that is set is exceeded, the controller 180 sets the alerting mode for the event to the alerting mode that is assigned by the touch input that is applied to the timer bar 720. If the message is received after 8 minutes that is set in the drawings elapses, the controller 180 controls the haptic module 155 in such a manner that vibrating alerting is activated.

Figure 9A:
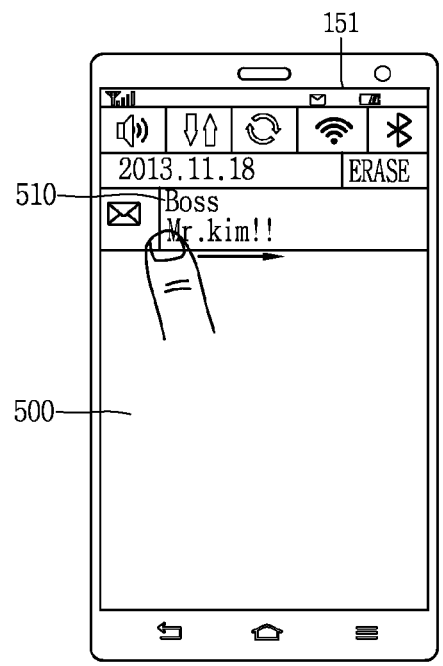
FIGS. 9A(a) to 9B(c) are diagrams for diagram for describing a control method of controlling the alerting mode for an event from a selected external terminal.
Figure 9A:
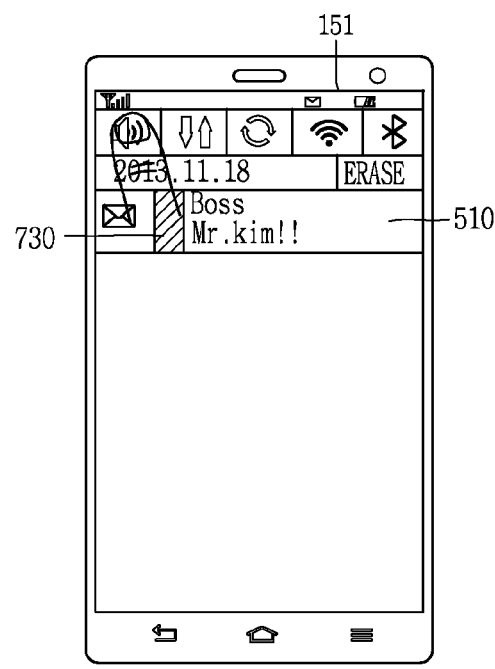
Figure 9A:
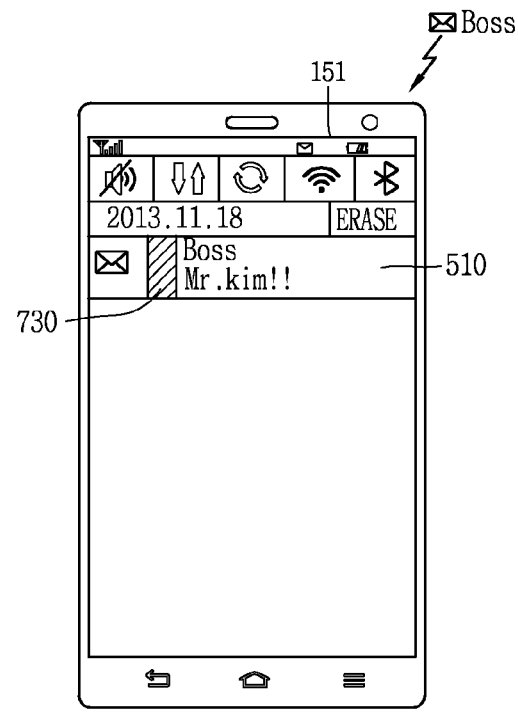
Figure 9A:
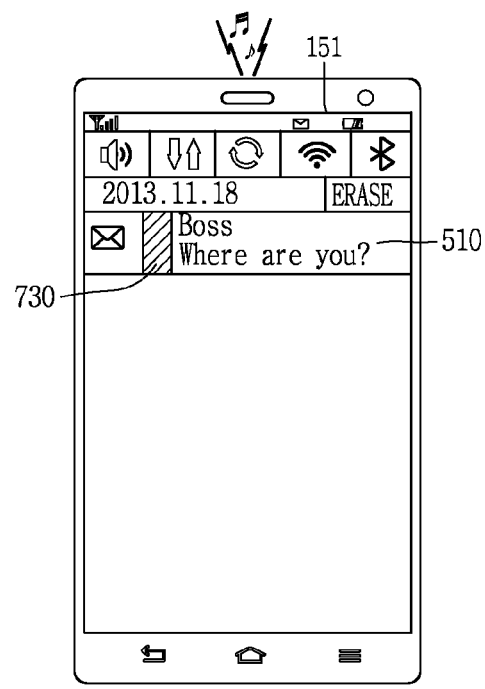

FIGS. 9A(a) to 9B(c) are diagrams for diagram for describing a control method of controlling the alerting mode for the event from the selected external terminal.

Referring to FIGS. 9A(a) to 9A(d), a control method of setting the alerting mode for the event that is received from a specific external mobile terminal. Referring to FIGS. 9A(a) and 9A(b), based on the touch input that is applied to the alerting image 510 in the opposite direction, the controller 180 sets a specific alerting mode for an event that is received from the external mobile terminal that transmits the event.

Based on the range over which the touch is dragging on the alerting image 510, the controller 180 controls the display unit 151 in such a manner that the timer bar 730 is output.

Referring to FIGS. 9A(b) and 9A(c), the controller 180 sets the audio mode for an event that is received from an external terminal (BOSS) that transmits the event. Based on a user's control command, the controller 180 changes the alerting mode for the mobile terminal to the mute mode.

If after the mobile terminal is set to the mute mode, the event is received from the external mobile terminal (BOSS), the controller 180 controls the sound output unit 153 in such a manner that the alerting audio associated with the event is output.

Although not illustrated in the drawings, for an event other than the event received from the specific external mobile terminal, the controller 180 outputs alerting data based on the mute mode.

Referring to FIGS. 9B(a) to 9B(c), a control method of applying substantially the same alerting mode to different types of events that are received from the external terminals that are substantially the same.

Referring to FIG. 9B(a), the alerting mode for the mobile terminal stays set to the audio mode. Based on the touch input that is applied to the alerting image 510, the controller 180 sets the mute mode for a first event that is received from a first external mobile terminal.

Referring to FIG. 9B(b), based on the touch input that is applied to the alerting image 510 associated with a second event that is received from a second external mobile terminal, the controller 180 sets the audio mode for the event that is received from the second external mobile terminal.

Referring to FIG. 9B(c), if the first events are received from the first and second external mobile terminals, respectively, the controller 180 applies the mute mode to the first event (message) from the first external mobile terminal and applies the audio mode to the first event (message) from the second external mobile terminal.

That is, the user can perform setting in such a manner that the same alerting mode is applied to all different types of events that are received from a specific external mobile terminal.

Figure 10A:
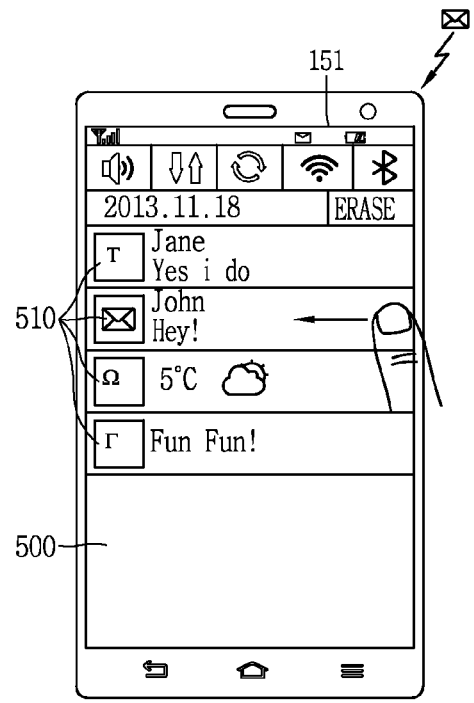
FIGS. 10A and 10B are diagrams for describing an arrangement of the alerting images on a state screen.
Figure 10B:
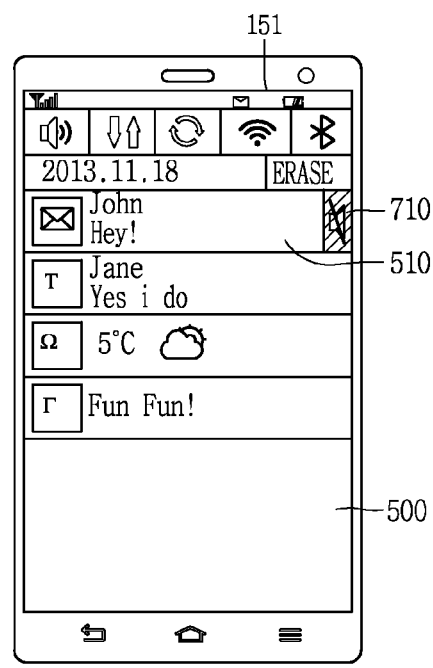

FIGS. 10(a) and 10(b) are diagrams for describing an arrangement of the alerting images on the state screen. Referring to FIG. 10(a), the state screen 500 includes the multiple alerting images 510 that are arranged along a lengthwise direction of the display unit 151.

Based on the touch input that is applied to the alerting image 510, the controller 180 controls the display unit 151 in such a manner that the alerting image 510 is arranged on the uppermost region of the display unit 151.

As illustrated in the drawings, if the alerting mode is set for the second event based on the touch input that is applied to the alerting image 510 that is arranged on the second uppermost region, the controller 180 controls the display unit 151 in such a manner that the alerting image 510 for the event for which the alerting mode is set is output on the uppermost region of the display unit 151.

Accordingly, the user can recognize the event for which a specific alerting mode is set, on the state screen in a more rapid manner.

Figure 11A:
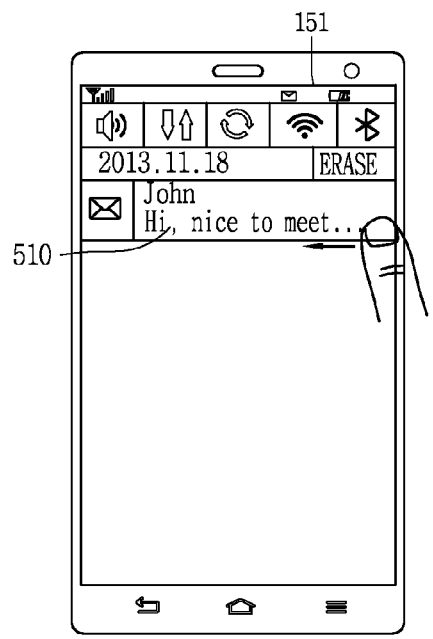
FIGS. 11A(a) to 11B(d) are diagram for describing a control method of outputting visual information included in the alerting image.
Figure 11A:
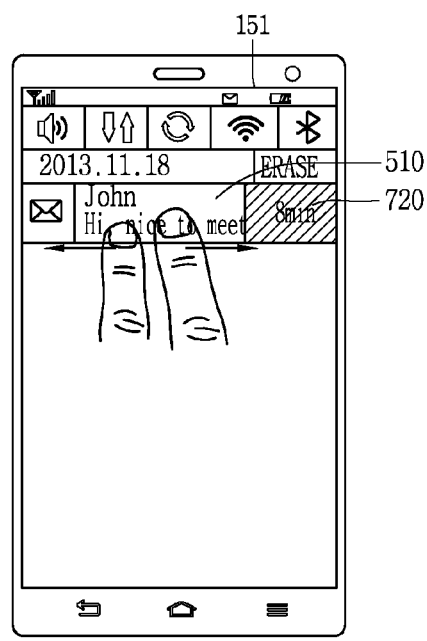
Figure 11A:
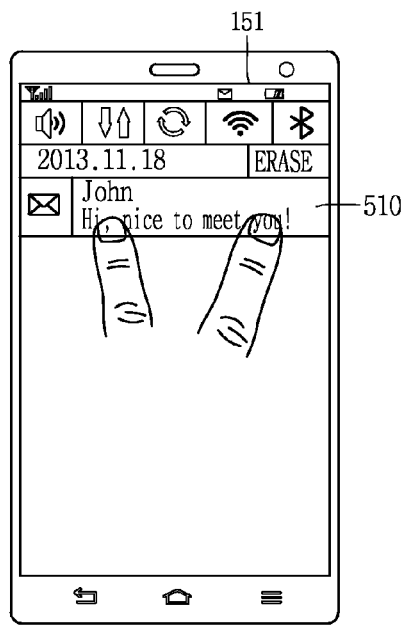
Figure 11A:
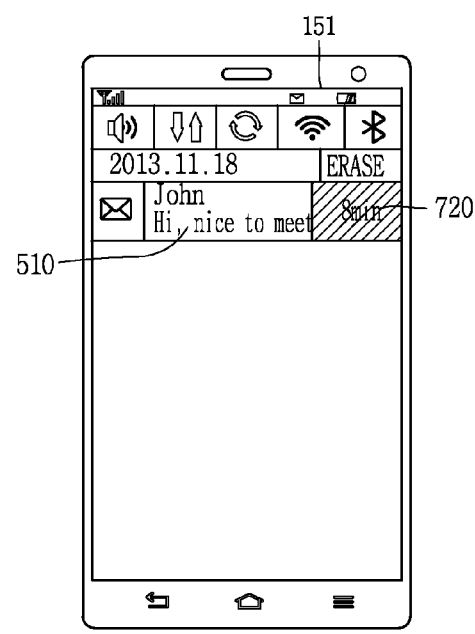

FIGS. 11A(a) to 11B(d) are diagram for describing a control method of outputting the visual information included in the alerting image.

Referring to FIGS. 11A(a) and 11A(b), the alerting image 510 includes the visual information relating to the event. At this point, the visual information corresponds to an icon of an application associated with the event, text and an image included in the event, the time at which the event is received, or the like. In addition, the alerting image 510 is formed in a predetermined size.

Based on the continuous touch input that is applied to the alerting image 510, the controller 180 controls the display unit 151 in such a manner that the timer bar 720 is output. The timer bar 720 is output on the alerting image 510 on the display unit 151, and thus, the more increased the range of the touch input, the more increased an output area of the timer bar 720 is output and the more decreased an output area of the alerting image 510.

Referring to FIGS. 11A(b) and 11A(c), based on a sixth touch input(1) that is applied to one region of the alerting image 510 to which the visual information is output, the controller 180 controls the display unit 151 in such a manner that the area of the timer bar 720 is temporarily decreased and the visual information is output. In addition, the sixth touch(1) input is released from the display unit 151, the controller 180 controls the display unit 151 in such a manner that the output area of the timer bar 730 is restored.

At this point, the sixth touch input corresponds to a pinch-in type touch input. That is, control is performed in such a manner that as the multi-touch inputs that are applied to different region at substantially the same time are more dragged in the opposite directions, the area to which the visual information is more increased.

However, according to the present embodiment, even though the fifth touch input is applied, a change in the shape of the alerting image 510 is limited on the display unit 151. However, a limit to this is not imposed. A control method of outputting the visual information is described below.

Figure 11B:
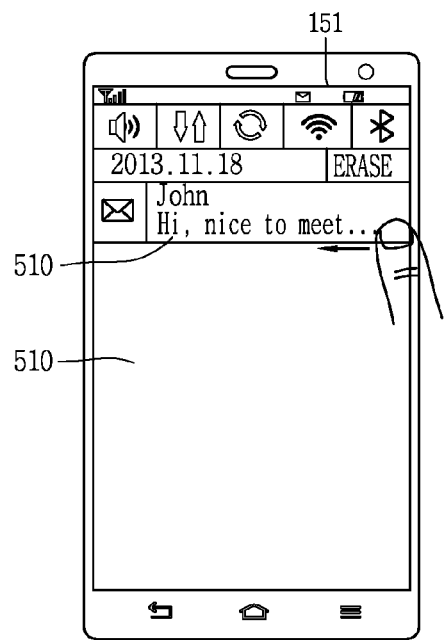
Figure 11B:
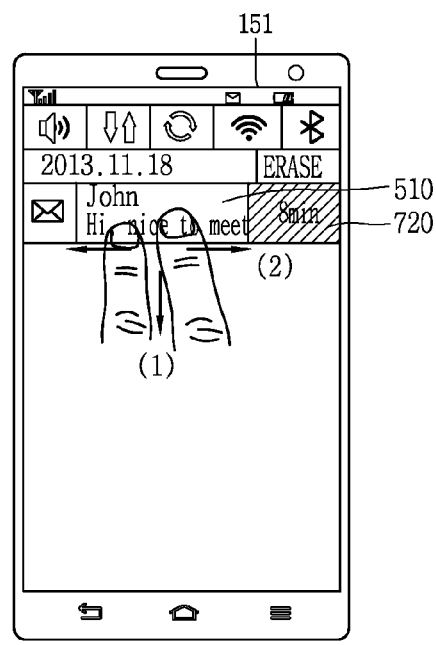
Figure 11B:
Figure 11B:
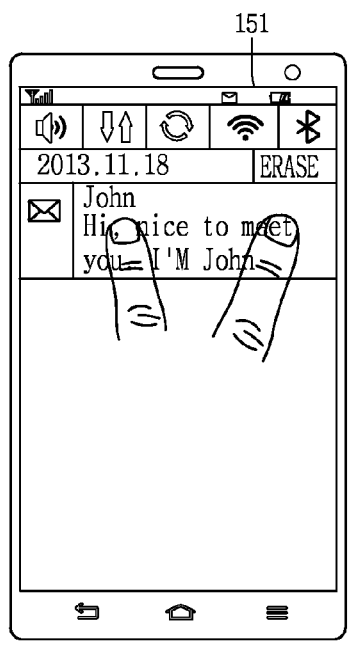

Referring to FIGS. 11B(b) to 11B(d), based on the fifth touch input(2), the controller 180 controls the display unit 151 in order to output the visual information, in such a manner that the outputting of the timer bar 720 is temporarily limited, and the alerting image 510 is enlarged and output. However, a limit to this is not imposed. The alerting image 510 is enlarged and at the same time, the timer bar 720 is output together.

Bases on the sixth touch input, the controller 180 controls the display unit 151 in such a manner that the shape of the alerting image 510 is changed to a predetermined extended area. Although not illustrated in the drawings, the controller 180 controls the display unit 151 in such a manner that when the sixth touch input is released, the shape of the alerting image 510 is restored.

Referring to FIGS. 11B(b) and 11B(b), based on a seventh touch input, the controller controls the display unit 151 in such a manner that the shape of the alerting image 510 is changed. For example, the seventh touch input corresponds to multi-touch, that is, a continuous touch input that is dragged along the lengthwise direction of the display unit 151.

The controller 180 expands the size of the alerting image 510, corresponding to the dragging of the touch input. In addition, when the seventh touch input is applied, the controller 180 controls the display unit 151 in such a manner that the outputting of the timber bar 720 is temporarily limited.

Accordingly, with the simple touch input, the user can be provided with the visual information on the event that is difficult to recognize due to the outputting of the timer bar 720 for setting the application range of the alerting mode.

Figure 12A:
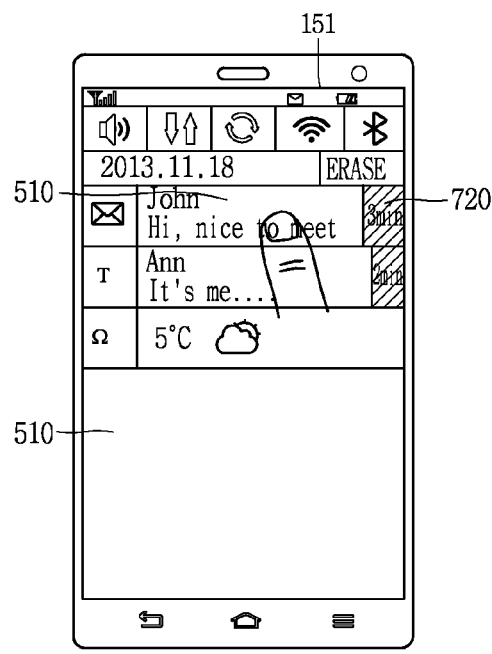
FIG. 12A(a) to FIG. 12B(d) are diagrams for describing a control method of moving an output position of the alerting image.
Figure 12A:
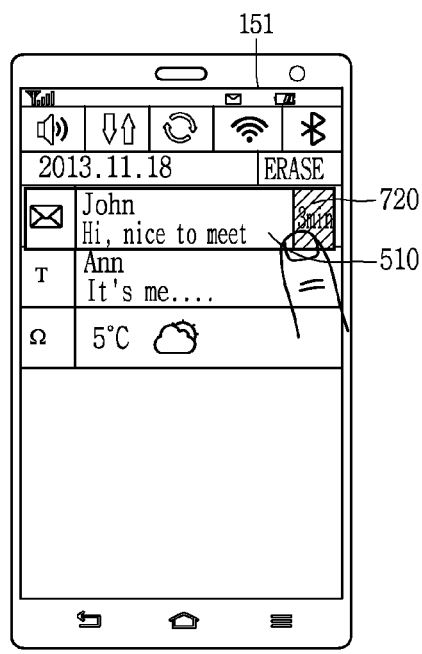
Figure 12A:
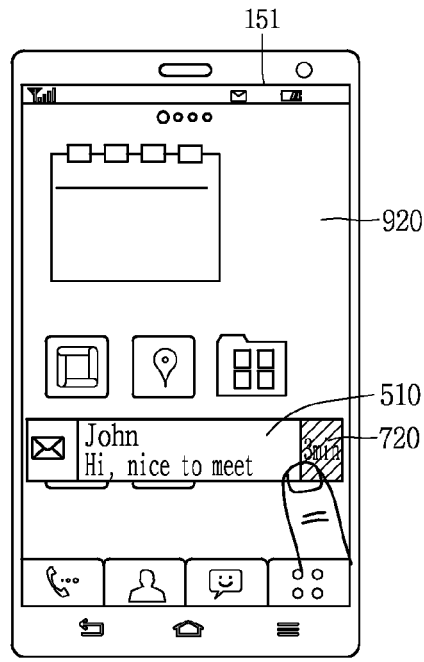
Figure 12A:
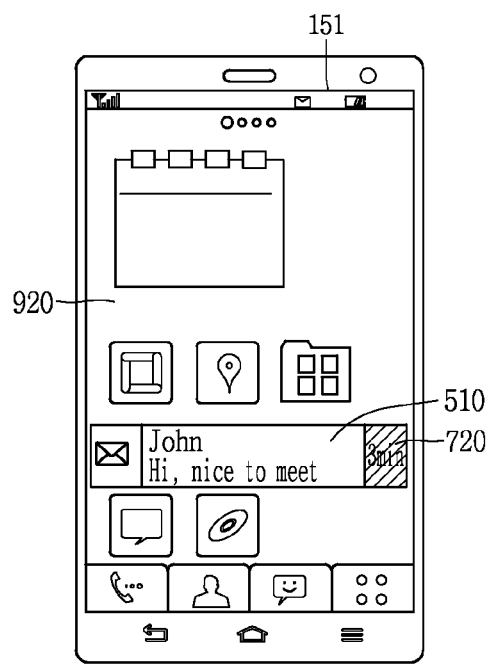
Figure 12B:
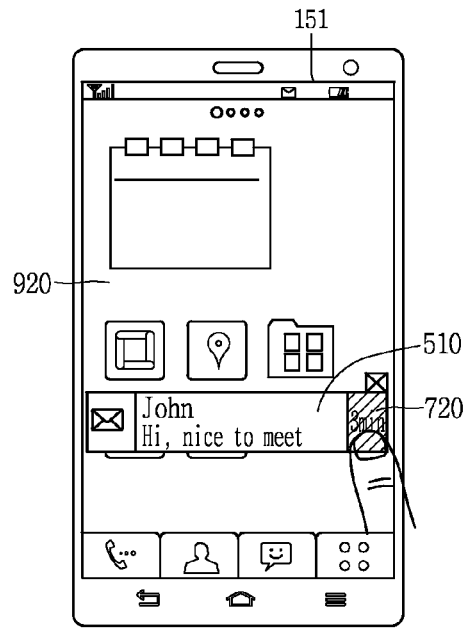
Figure 12B:
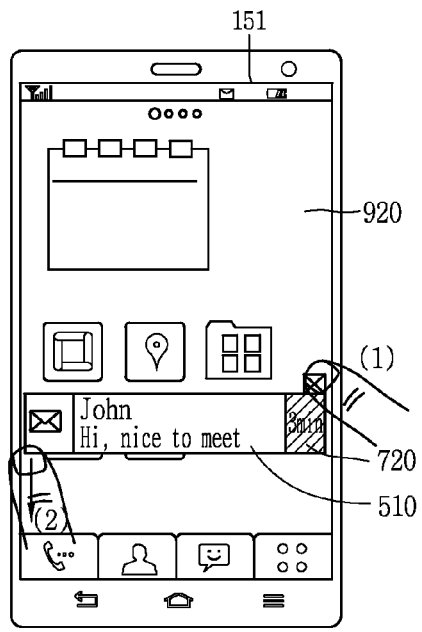
Figure 12B:
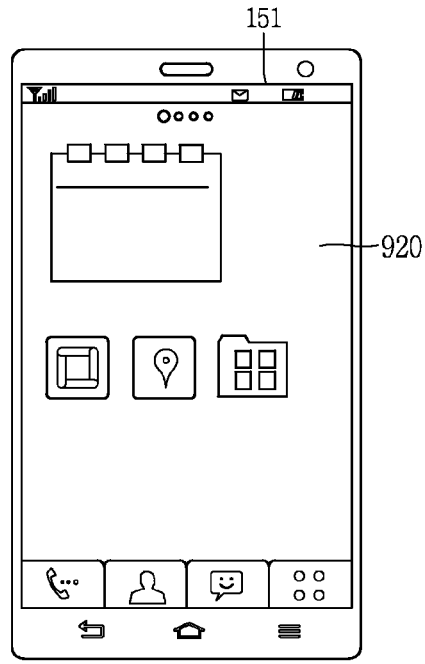
Figure 12B:
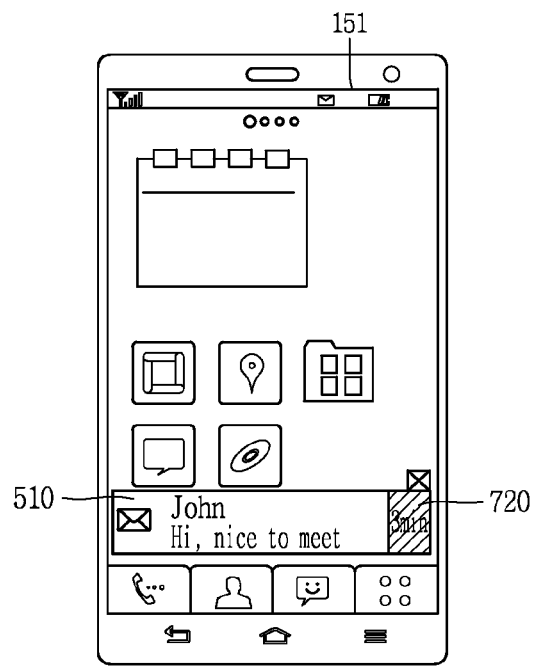

FIG. 12A(a) to FIG. 12B(d) are diagrams for describing a control method of moving an output position of the alerting image.

Referring to FIGS. 12A(a) to 12A(d), a control method of forming the alerting image in the shape of a widget. Based on the touch input that is applied to the alerting image 510, the controller 180 moves the alerting image 510 to a home screen page 920. At this point, the home screen page 920 corresponds to screen information that includes at least one icon, the icon, the widget, and the like that are arranged according to a predetermined layout.

Referring to FIGS. 12A(c) and 12A(d), when the touch input that is applied to the alerting image 510 is released, based on the layout that is set for the home screen page 920, the controller 180 controls the display unit 151 in such a manner that the alerting image 510 is displayed on the home screen page 920. That is, the alerting image 510 makes up the home screen page 920 without overlapping the icons and the like that are included on the home screen page.

The position in which the alerting image 510 is output on the home screen page 920 is changed, or the alerting image 510 is deleted based on the user's control command.

Based on the touch input that is applied to the alerting image 510 that makes up the home screen page 920, the controller 180 executes an application that corresponds to the event. If the application is executed with the touch input that is applied to the alerting image 510, based on user's setting, the controller 180 controls the display unit 151 in such a manner that the outputting of the alerting image 510 on the home screen page 920 is limited.

In addition, the alerting image 510 includes the timer bar 720 that is set by the user. If the application range is exceeded, the controller 180 controls the display unit 151 in such a manner that the outputting of the alerting image 510 on the home screen page is limited.

Accordingly, on the home screen page, the user can the event for which a specific alerting mode is set.

Referring to FIGS. 12B(a) to 12B(d), a control method of forming the alerting image in the shape of a pop-up window is described. Based on the touch input that is applied to the alerting image 510, the controller 180 controls the display unit 151 in such a manner that the alerting image 510 is output on the home screen page 920.

According to the present embodiment, the alerting image 510 is output in such a manner to overlap at least one icon and the like that are included in the home screen page 920. In addition, the controller 180 controls the display unit 151 in such a manner that the output position on the home screen page 920, to which the alerting image 510 is output, is changed. In addition, the alerting image 510 that is formed in the shape of a pop-up window on the home screen page 920 includes an icon for limiting the outputting of the alerting image 510. For example, the icon corresponds to a graphic image that receives the touch input in order to delete the alerting image 510 from the home screen page 920.

Although not specifically illustrated in the drawings, based on the touch input that is applied to an edge region of the alerting image in the shape of a pop-up window, the controller 180 controls the display unit 151 in such a manner that the size of the alerting image 510 is changed.

In addition, when the application range is decreased to zero, based on the timer bar 720 included in the alerting image 510, the controller 180 controls the display unit 151 in such a manner that the outputting of the alerting image 510 is limited.

Accordingly, the user can be provided with the information on the event without outputting the state screen 500, or activating the application. Furthermore, the user can understand the information on the event for which the application range is set, in a more easy manner.

FIGS. 13A to 13D are diagrams for describing a control method of controlling the alerting image for the event that is received in an inactivated state of the display unit 151.

If the touch input that is applied to the display unit 151 is not detected for a predetermined time or if a user's control command for switching to the inactivated state is received, the controller 180 switches the display unit 151 to the inactivated state. The time data is not output to the display unit 151 in the inactivated state. The user's touch input is not detected on the display unit 151 in the inactivated state.

However, if the mobile terminal receives the event, the controller 180 controls the display unit 151 in such a manner that the alerting image 610 corresponding to the event is output. Only the alerting image 610 other than the time data may be output on a specific position on the display unit 151. In this case, the user's touch input that is applied to one region other than the region of the display unit 151 to which the alerting image 610 is output is disregarded on the display unit 151.

Figure 13A:
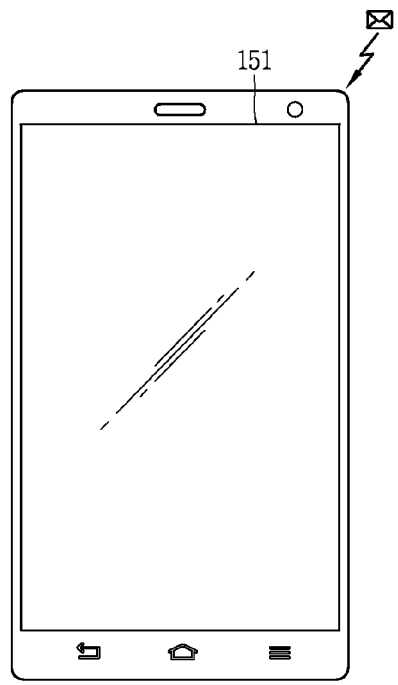
FIGS. 13A to 13D are diagrams for describing a control method of controlling the alerting image for the event that is received in an inactivated state of a display unit.
Figure 13B:
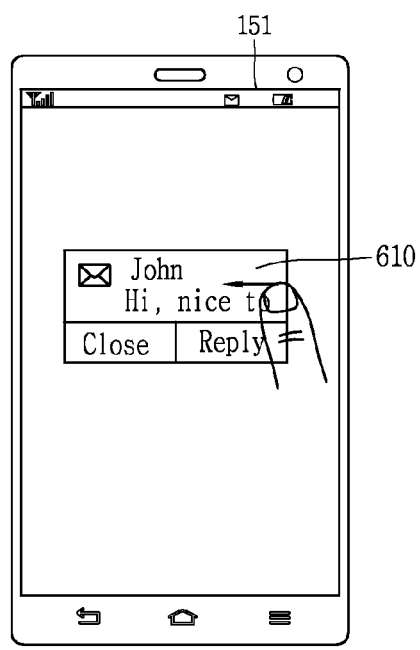
Figure 13C:
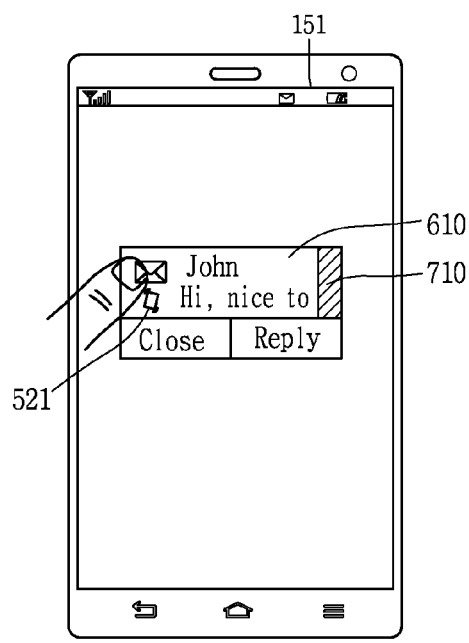

Referring to FIGS. 13B and 13C, based on the touch input that is applied to the alerting image 610 in one direction, the controller 180 sets the alerting mode for the event, and controls the display unit 151 in such a manner that the mode image 710 is accordingly output. In addition, based on the touch input that is continuously applied to the alerting image 610, the controller 180 sets the application range that is to be applied to the alerting mode, and controls the display unit 151 in such a manner that the timer bar is output on the alerting image 510.

Figure 13D:
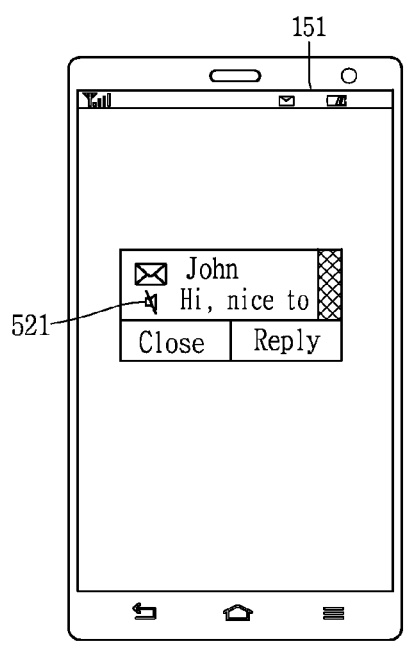

Referring to FIGS. 13C and 13D, the alerting image 610 includes an icon of an application associated with the event and a mode icon associated with the alerting mode icon 521. In addition, based on the touch input that is applied to the icon of the application or the alerting mode icon 521, the controller 180 changes the alerting mode. In addition, even though the touch input is applied to the mode image or the timer bar, the controller 180 changes the alerting mode.

In addition, although not illustrated in the drawings, based on the touch input that is applied to the alerting image 610, the controller 180 activates the entire display unit 151, and controls the display unit 151 in such a manner that the alerting image 610 is arranged on the home screen page 920.

Figure 14A:
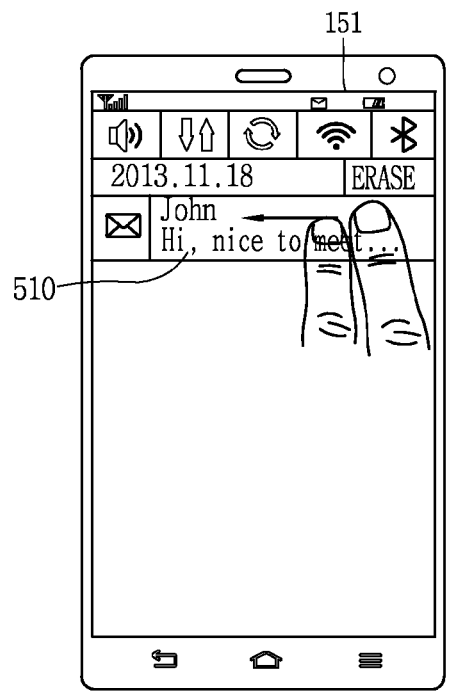
FIGS. 14A(a) to 14C(b) are diagrams for describing a control method of changing setting of alerting for an application.
Figure 14A:
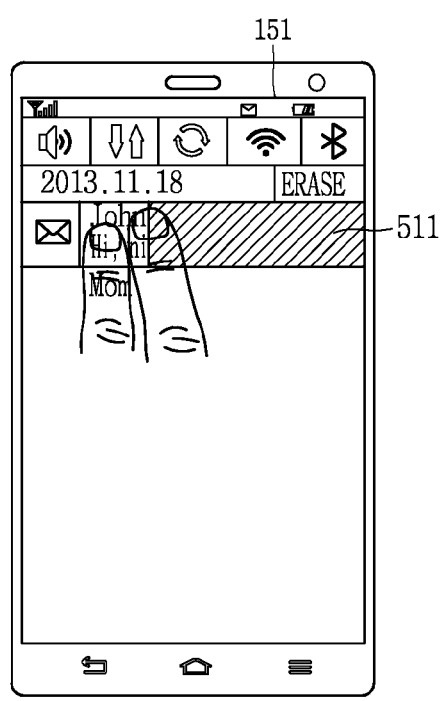

FIGS. 14A(a) to 14C(b) are diagrams for describing a control method of changing the setting of alerting for an application.

Referring to FIG. 14A(a) to 14A(d), based on an eighth touch input that is applied to the alerting image 510, the controller 180 controls the touch input 151 in such a manner that a setting bar 530 is output. There is no limit to the type of eighth touch input, but the eighth touch input corresponds to the multi-touch, that is, the dragging-type touch input that is dragged in one direction.

Referring to FIGS. 14A(a) to 14A(b), the controller 180 controls the display unit 151 in such a manner that one portion of the alerting image 510 is gradually transformed into a cover image 511 in order to correspond the touch range of the eighth touch input. When the touch range reaches a predetermined reference range or above, the controller 180 controls the display unit 151 in such a manner that the alerting image 510 and the cover image 511 are switched to the setting bar 530.

The cover image 511 is configured to have a predetermined color and is configured from a translucent layer. The setting bar 530 is realized in substantially the same form as the alerting image 510. The control unit 180 performs the display unit 151 in such a manner that while transparency of the cover image 511 becomes higher and higher based on the eighth touch input, the setting bar 530 is output. For example, the controller 180 controls the display unit 151 in such a manner that when the touch range of the eighth touch input reaches the reference range, the transparency of the cover image 511 is improved.

Each of the alerting image 510, the cover image 511 and the setting bar 530, as illustrated in FIG. 14A(e), is configured from a virtual layer. That is, the alerting image 510, the cover image 511 and the setting bar 530 are output in such a manner that when the touch input is applied, the uppermost layer, among virtual layers that overlap one another with one layer being stacked on the top of another, disappears. Accordingly, the user can feel as if he/she moved the multiple layers one after another by the touch input.

Referring to FIG. 14A(c), the setting bar 530 includes a first graphic image 531, a second graphic image 532, and a third graphic image 533. The graphic image 531 receives the touch input for switching to a setting screen. The second graphic image 522 receives the touch input for blocking/canceling the alerting audio for an application associated with the event. The third graphic image 533 receives the touch input for limiting the alerting to the receiving of the event associated with the application. When the receiving of the event is OFF using the third graphic image 533, all push alarms for the application are blocked.

When the first graphic image 511 receives the touch input, the controller 180 controls the display unit 151 in such a manner that the state screen 500 is switched to a setting screen 930.

The setting screen 930 further includes icons of applications that are arranged to set an application that needs the setting of the alerting mode, and the second and third graphic images 522 and 523.

However, a configuration of the setting screen 930 is not limited to this. The configuration is described in detail below referring to FIGS. 14B(a) and 14B(b).

Figure 14B:
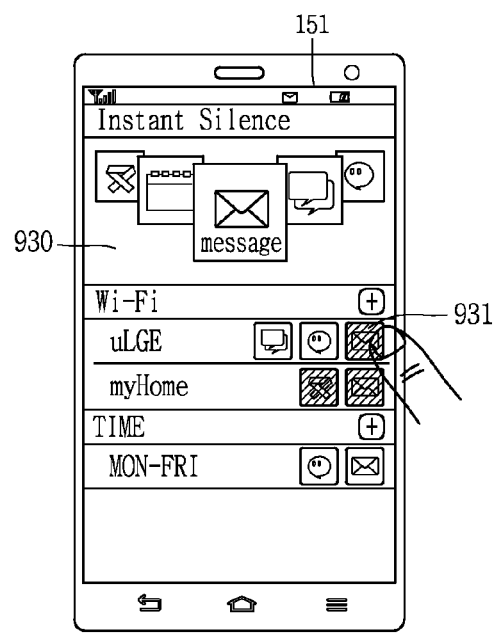
Figure 14B:
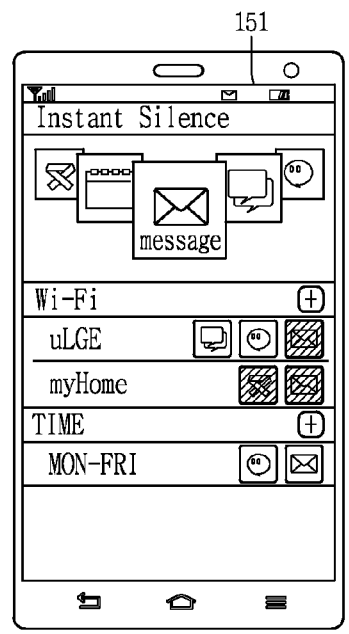

FIGS. 14B(a) and 14B(b) are diagrams illustrating the display unit 151 to which the setting screen 930 according to one embodiment is output. For example, the user can set the alerting mode for each event based on a communication network that is currently accessed.

The setting screen 930 includes pieces of information on the communication networks available for connection, and icons of applications that are matched to the communication networks. That is, if a connection to a specific communication network is established, the user can set the alerting mode for reception of an event associated with a specific application.

In addition, the setting screen 930 includes icons of applications that are categorized by period of time. That is, the user can set the alerting mode for reception of an event associated with an application during a specific period of time.

Referring to FIGS. 14B(a) and 14B(b), based on the touch input that is applied to an icon 931 of the application, the controller 180 changes the alerting mode for reception of the event associated with the application. For example, based on the touch input that is applied to the icon 931, the controller 180 switches the alerting mode for the application from the mute mode to the vibration mode.

In addition, based on the user's control command, the controller 180 may add a communication and a period of time, and may add an icon 931 of an application to be applied.

Figure 14C:
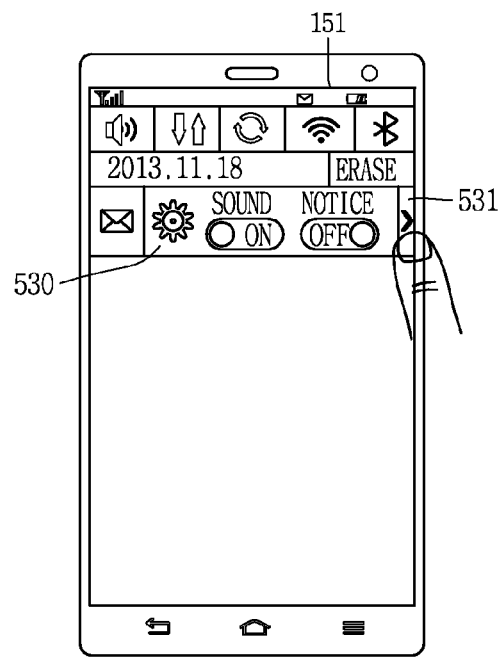
Figure 14C:
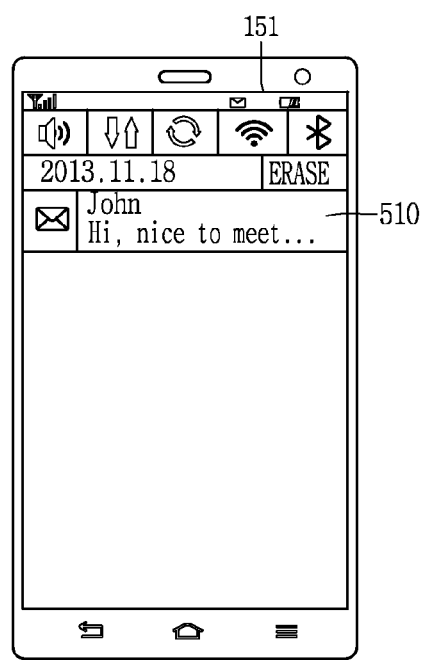

Referring to FIGS. 14C(a) to 14C(b), a control method of switching to the alerting image on the setting bar. As illustrated in the drawing, in order to output the alerting image 510 again, the setting bar 530 includes a closing icon 531 that is formed to receive the touch input. Accordingly, after completing the setting of the alerting mode for the application that corresponds to the event, the user can output the alerting image 510 again.

Accordingly, an event alerting mode for the application itself that corresponds to the event is set individually and integrally.

Figure 15A:
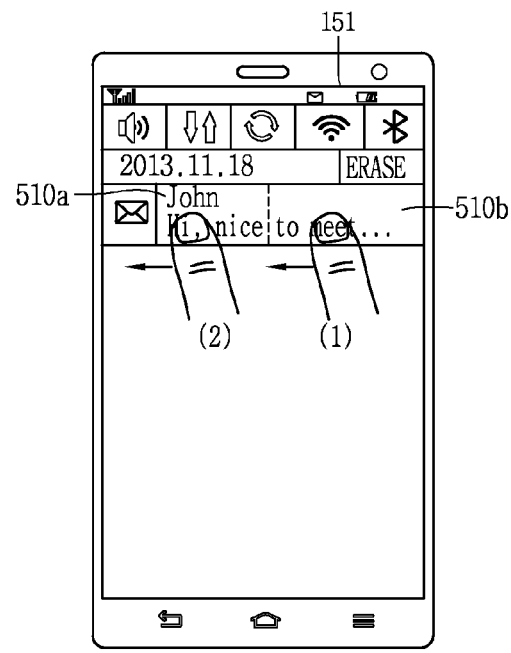
FIGS. 15A(a) and 15B(d) are diagrams for describing a control method of outputting an information bar that includes different pieces of information based on a touch input that is applied to the alerting image.
Figure 15A:
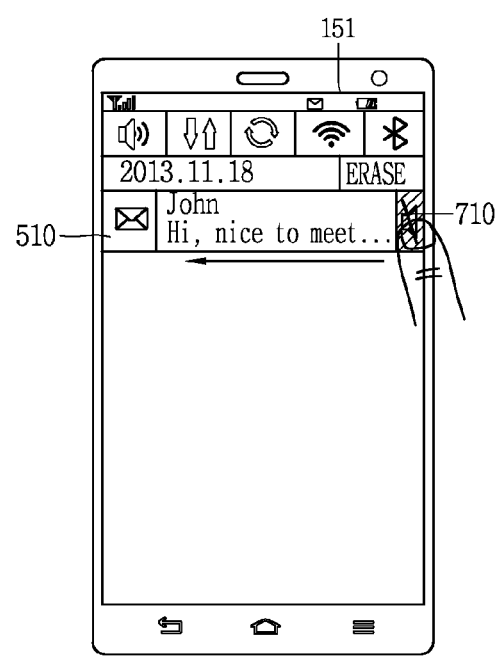
Figure 15A:
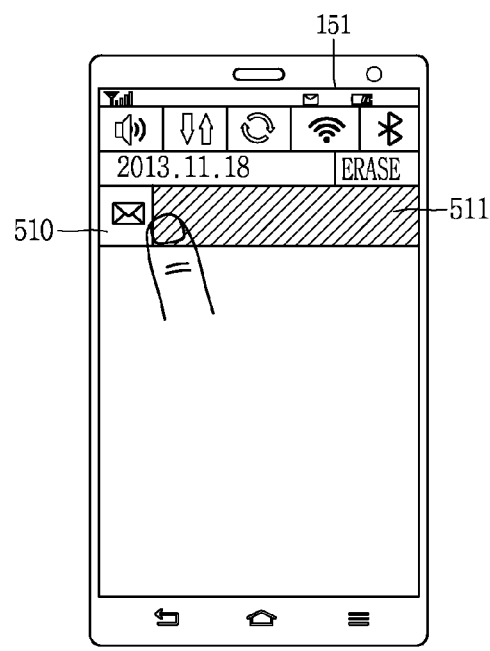
Figure 15A:
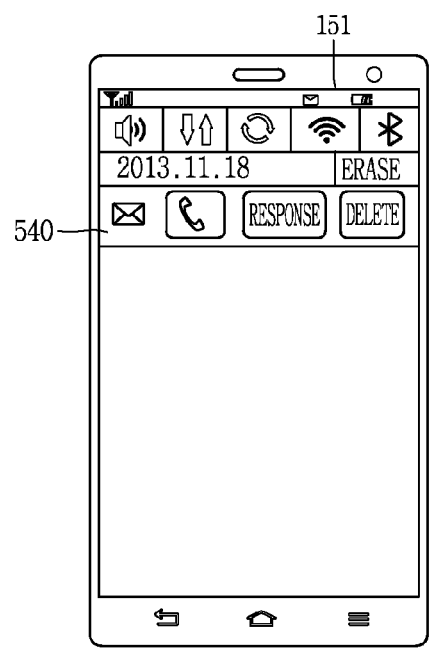

FIGS. 15A (a) to 15B(d) are diagrams for describing a control method of outputting an information bar that includes different pieces of information based on the touch input that is applied to the alerting image.

Referring to FIG. 15A(a) to 15A(d), the control method of outputting the bar that includes different pieces of information based on the touch inputs that are applied to different regions of the alerting image 150 is described. For example, the controller 180 defines the alerting image 510 as first and second virtual regions 510a and 510b. The controller 180 determines to which region of the alerting image 510 the touch input is first applied, and then controls the mobile terminal.

Referring to FIGS. 15A(a), 15A(b), and 15A(c), based on the continuous touch input that is first applied to the second region 510b, the controller 180 controls the display unit 151 in such a manner that the mode image 710 is output, and changes the alerting mode for the application. In addition, if the touch input is applied and dragged over a predetermined range, starting from a right-side region, the controller 180 controls the display unit 151 in such a manner that the alerting image 510 is switched to a control bar.

In addition, when the range over which, after the continuous touch input is first applied, is dragged on the second region 510b exceeds a predetermined range, the controller 180 controls the display unit 151 in such a manner that the cover image 511 is output.

At this point, the control bar 540 includes at least one icon, and based on the touch input that is applied to the icon, the controller 180 performs control of the application associated with the event. For example, based on the icon, the controller 180 performs processing, such as responding to a message, making a call to an external mobile terminal, deleting the message and so forth.

Referring to FIGS. 15A(a) to 15A(d), based on the touch input that is applied to the first region 510a, the controller 180 controls the display unit 151 in such a manner that the alerting image 510 is switched to the control bar.

However, a touch region where the alerting image 510 is divided is not limited to this. Based on the user's setting, control is performed in such a manner that different control bars 540 are output with the touch input that is applied to each region. That is, the user can be provided with different pieces of information by applying the touch inputs in different ranges to different regions of the alerting image 510.

Figure 15B:
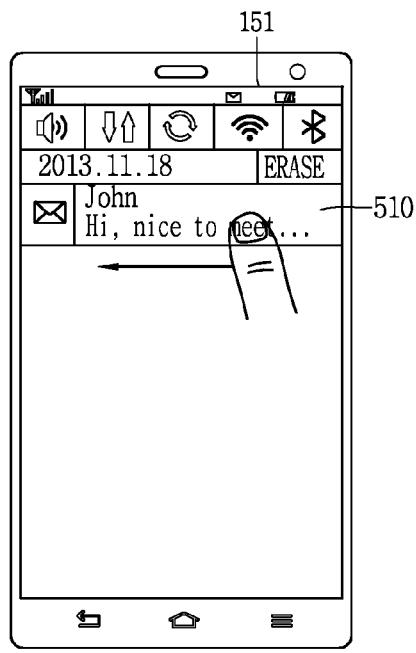
Figure 15B:
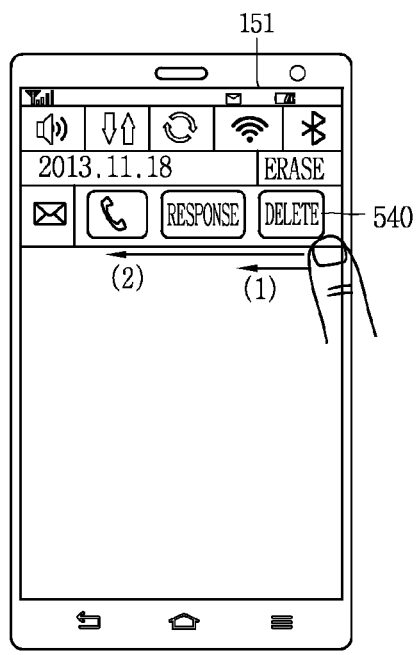
Figure 15B:
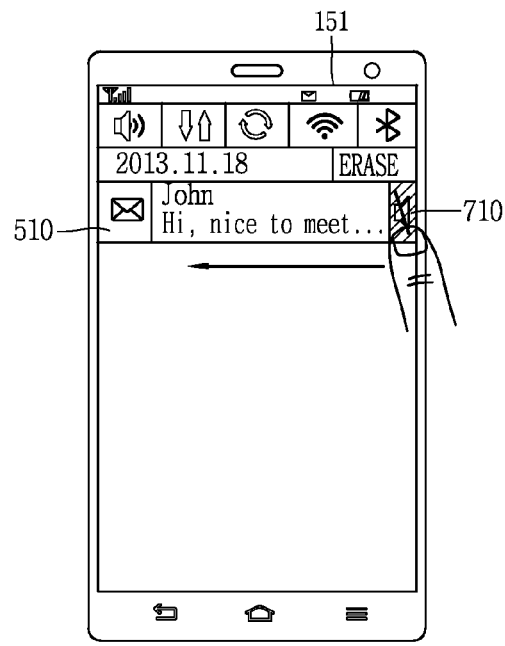
Figure 15B:
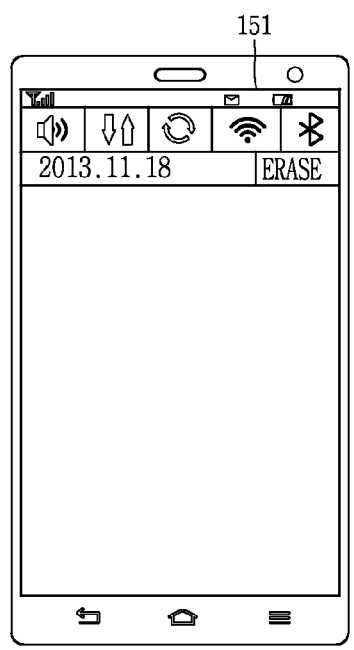

Referring to FIG. 15B(a) to 15B(d), a control method of outputting a bar including different pieces of information based on the touch input that is applied to the alerting image, according to different embodiments, is described.

Referring to FIGS. 15B(a) and 15B(b), based on the continuous touch input that is applied to the alerting image 510, the controller 180 controls the display unit 151 in such a manner that the control bar 540 is output.

Referring to FIGS. 15B(b) to 15B(d), based on the continuous touch input that is applied to the control bar 540 and is dragged over the range that exceeds a predetermined reference range, the controller 180 controls the display unit 151 in wherein the control the outputting of the control bar 540 is limited. That is, the user can delete the control bar 540 with the continuous touch input that is applied to the control bar 540 and is dragged over the range that exceeds the predetermined range.

Referring to FIGS. 15B(b) and 15B(c), based on the continuous touch input that is applied to the control bar 540, the controller 180 controls the display unit 151 in such a manner that the mode image 710 is output, and controls the mobile terminal in such a manner that the alerting mode for application associated with the event is changed.

In addition, when in a state where the control bar 540 is output, the continuous touch input is applied again, the controller 180 controls the display unit 151 in such a manner that the outputting of the control bar 540 is limited. That is, the user can control the mobile terminal in such a manner that the bar-shaped screen information that is output to the display unit 151 is deleted, by applying the continuous touch input to the display unit 151. In addition, based on the user's continuous touch input, the controller 180 controls the display unit 151 in such a manner that different images are sequentially output. At this point, the continuous touch input may be a different type of touch input that has a different touch range.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a touchscreen configured to display information; and
a controller configured to:
cause the touchscreen to display a state screen including a plurality of event notification images when an event is received at the mobile terminal and to change the displayed state screen based on a type of touch input received to the one of the plurality of displayed event notification images, wherein each of the plurality of event notification images respectively corresponds to an application of a plurality of applications;
when a first touch input is received to the one of the plurality of event notification images via the touchscreen, cause the touchscreen to change the state screen to an execution screen related to the event, wherein the execution screen includes received information of the event and controls one of the plurality of applications related to the event and wherein the one of the plurality of notification images is no longer displayed when the execution screen is displayed in response to the first touch input; and
when a second touch input is received to the one of the plurality of event notification images via the touchscreen, cause the touchscreen to change the one of the plurality of event notification images of the state screen to include a selectable option which corresponds to a function related to the one of the plurality of event notification images,
wherein the first touch input corresponds to a single touch input on the one of the plurality of event notification images and the second touch input corresponds to a dragging touch in a first direction on the one of the plurality of event notification images toward a first side of the displayed one of the plurality of event notification images and the selectable option is increasingly displayed at a second side of the displayed one of the plurality of event notification images opposite the first side as a length of the second touch input increases.

2. The mobile terminal of claim 1, wherein the controller is further configured to cause the touchscreen to terminate displaying the one of the plurality of event notification images when a length of the dragging touch exceeds a threshold length.

3. The mobile terminal of claim 1, wherein the displayed execution screen includes received information of the event.

4. The mobile terminal of claim 1, wherein the displayed execution screen includes a first input area for inputting information for one of the plurality of applications associated with the execution screen related to the event.

5. The mobile terminal of claim 4, wherein the event comprises a received message and the one of the plurality of applications corresponds to messaging application for composing a response to the received message.

6. The mobile terminal of claim 1, wherein the controller is further configured to change a mode to block alerts related to the event in response to a touch input applied to the selectable option.

7. The mobile terminal of claim 1, wherein the selectable option comprises an option for terminating display of the one of the plurality of event notification images and an option for executing one of the plurality of applications related to the event.

8. The mobile terminal of claim 1, wherein the controller is further configured to cause the touchscreen to display:
a plurality of event notification images corresponding to a plurality of events received at the mobile terminal; and
at least one selectable option corresponding to one or more of the plurality of event notification images in response to the option input, wherein the one or more of the plurality of event notification images each correspond to a same type of event of the plurality of events.

9. A method for controlling a mobile terminal, the method comprising:
displaying a state screen including a plurality of event notification images when an event is received at the mobile terminal and changing the displayed state screen based on a type of touch input received to one of the plurality of displayed event notification images, wherein each of the plurality of event notification images respectively corresponds to an application of a plurality of applications;
when a first touch input is received to the one of the plurality of event notification images, changing the state screen to an execution screen related to the event, wherein the execution screen includes received information of the event and controls one of the plurality of applications related to the event and wherein the one of the plurality of notification images is no longer displayed when the execution screen is displayed in response to the first touch input; and
when a second touch input is received to the one of the plurality of event notification images via the touchscreen, displaying a selectable option which corresponds to a function related to the one of the plurality of event notification images,
wherein the first touch input corresponds to a single touch input on the one of the plurality of event notification images and the second touch input corresponds to a dragging touch in a first direction on the one of the plurality of event notification images toward a first side of the displayed one of the plurality of event notification images and the selectable option is increasingly displayed at a second side of the displayed one of the plurality of event notification images opposite the first side as a length of the second touch input increases.

10. The method of claim 9, further comprising terminating display of the one of the plurality of event notification images when a length of the dragging touch exceeds a threshold length.

11. The method of claim 9, wherein the displayed execution screen includes received information of the event.

12. The method of claim 9, wherein the displayed execution screen includes a first input area for inputting information for one of the plurality of applications associated with the execution screen related to the event.

13. The method of claim 12, wherein the event comprises a received message and the one of the plurality of applications corresponds to a messaging application for composing a response to the received message.

14. The method of claim 9, the method further comprises changing a mode to block alerts related to the received event in response to a touch input applied to the selectable option.

15. The method of claim 9, wherein the selectable option comprises an option for terminating display of the one of the plurality of event notification images and an option for executing one of the plurality of applications related to the first event.

16. The method of claim 9, further comprising:
displaying a plurality of event notification images corresponding to a plurality of events received at the mobile terminal; and
displaying at least one selectable option corresponding to one or more of the plurality of event notification images in response to the option input, wherein the one or more of the plurality of event notification images each correspond to a same type of event of the plurality of events.

* * * * *